United States Patent
Endo et al.

(10) Patent No.: US 9,784,637 B2
(45) Date of Patent: Oct. 10, 2017

(54) ADSORPTION CHARACTERISTIC MEASURING APPARATUS

(71) Applicants: NATIONAL INSTITUTE OF ADVANCED INDUSTRIAL SCIENCE AND TECHNOLOGY, Tokyo (JP); MicrotracBel Corporation, Osaka (JP)

(72) Inventors: Akira Endo, Tsukuba (JP); Marie Shimomura, Tsukuba (JP); Satoshi Taniguchi, Tsukuba (JP); Kazuyuki Nakai, Toyonaka (JP); Masayuki Yoshida, Toyonaka (JP); Makoto Okawa, Toyonaka (JP)

(73) Assignees: National Institute of Advanced Industrial Science and Technology, Tokyo (JP); MicrotracBEL Corp., Osaka (JP)

( * ) Notice: Subject to any disclaimer, the term of this patent is extended or adjusted under 35 U.S.C. 154(b) by 118 days.

(21) Appl. No.: 14/919,522

(22) Filed: Oct. 21, 2015

(65) Prior Publication Data
US 2016/0109321 A1 Apr. 21, 2016

(30) Foreign Application Priority Data
Oct. 21, 2014 (JP) ................................. 2014-214757

(51) Int. Cl.
*G01M 3/22* (2006.01)
*G01M 3/28* (2006.01)
(52) U.S. Cl.
CPC ................. *G01M 3/2846* (2013.01)

(58) Field of Classification Search
CPC .................................................. G01M 3/2846
(Continued)

(56) References Cited

U.S. PATENT DOCUMENTS

| 4,762,010 A | * | 8/1988 | Borghard | G01N 15/0893 |
| | | | | 73/38 |
| 5,133,219 A | * | 7/1992 | Camp | G01N 15/0893 |
| | | | | 73/865.5 |

(Continued)

FOREIGN PATENT DOCUMENTS

| JP | 2008-247702 A | 10/2008 |
| JP | 2014-081250 A | 5/2014 |

*Primary Examiner* — Natalie Huls
*Assistant Examiner* — Monica S Young
(74) *Attorney, Agent, or Firm* — Dorsey & Whitney LLP

(57) ABSTRACT

An adsorption characteristic measuring apparatus is configured to: acquire a unit-time leak pressure value from a pressure increase value of an internal pressure value of a sample tube caused by an non-adsorption gas leaking from the outside of a fitting portion into an inner space of the sample tube; acquire a pressure value at which a temporal change of the internal pressure value of the sample tube assumes an equilibrium state when an adsorption gas present in the reference volume portion is supplied into the sample tube and the sample tube is in a closed state; calculate a pressure value after correction of a real leak pressure value is performed on a measured equilibrium pressure value, as a true equilibrium pressure value, the real leak pressure value being obtained in such a manner that the unit-time leak pressure value is multiplied by a leak time; and calculate an adsorption isotherm.

6 Claims, 10 Drawing Sheets

(58) Field of Classification Search
USPC .......................................................... 73/40.7
See application file for complete search history.

(56) References Cited

U.S. PATENT DOCUMENTS

| | | | |
|---|---|---|---|
| 6,595,036 B1* | 7/2003 | Nakai | G01N 15/0893 422/69 |
| 2016/0076988 A1 | 3/2016 | Matsukata et al. | |

* cited by examiner

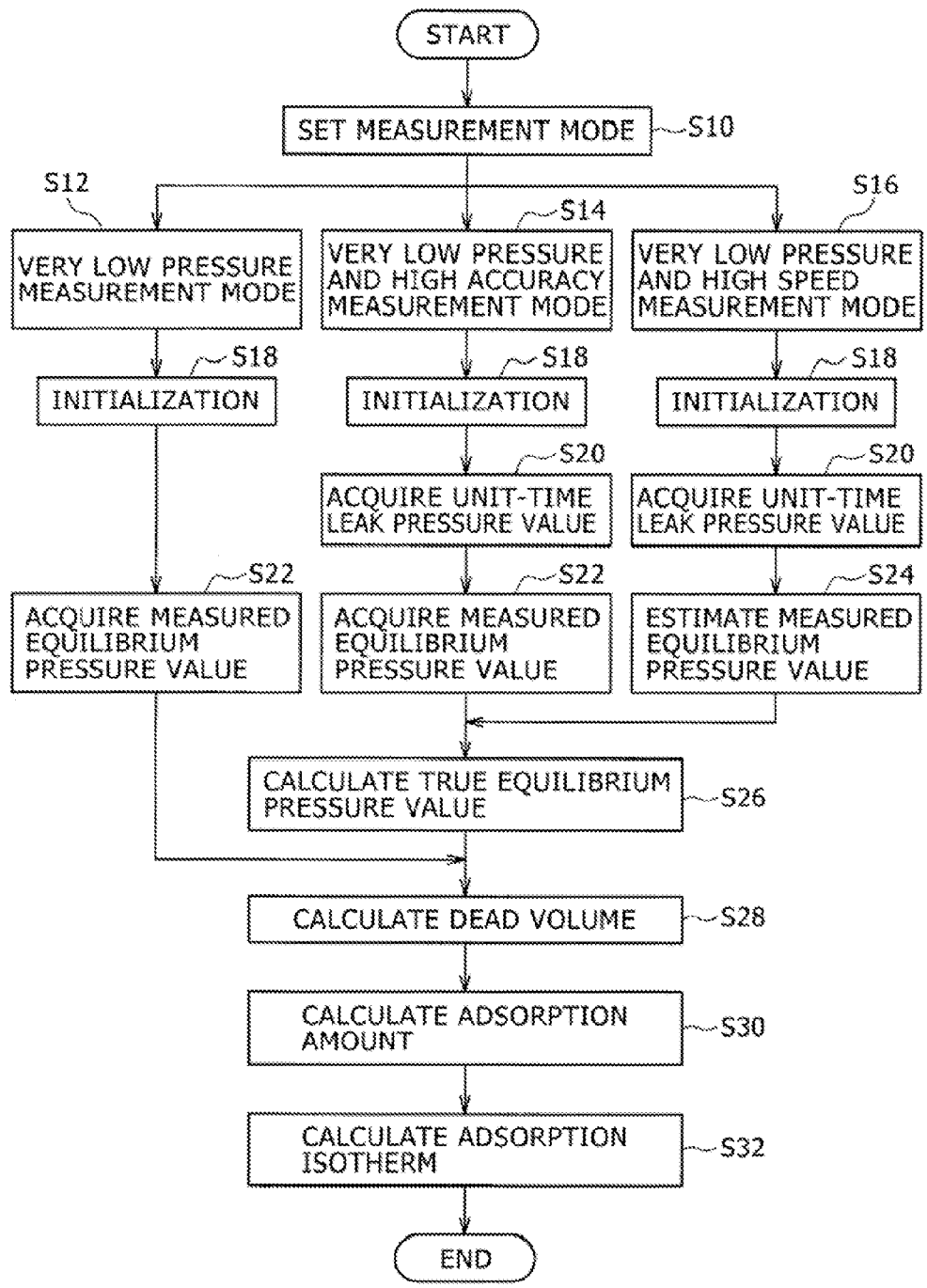
F I G . 2

ADSORPTION CHARACTERISTIC MEASURING APPARATUS

PRIORITY INFORMATION

This application claims priority to Japanese Patent Application No. 2014-214757, filed on Oct. 21, 2014, the entire disclosure of which is incorporated herein by reference.

BACKGROUND

Technical Field

The present invention relates to an adsorption characteristic measuring apparatus and more particularly to an adsorption characteristic measuring apparatus for obtaining an adsorption isotherm using a constant volume method.

Related Art

As a method of evaluating a pore distribution in a material or a specific surface area of the material, a gas adsorption method is used. For example, an adsorption characteristic measuring apparatus, which measures an adsorption isotherm using a constant volume method to evaluate a specific surface area or a pore distribution, includes a plurality of pressure gauges, valves such as on-off valves, and a vacuum exhaust system to supply an adsorption gas having a predetermined number of moles to a sample in the sample tube, which is set to constant volume and temperature, and to measure the pressure change before and after adsorption.

JP 2014-81250 A discloses an example where a powder sample is accommodated in a sample tube made of glass, a nitrogen gas is used as an adsorption gas, the sample tube is disposed in a Dewar vessel filled with liquid nitrogen, and a pressure change in the sample tube is measured under a constant liquid nitrogen temperature of 77K.

SUMMARY

An adsorption characteristic measuring apparatus is an apparatus in which a predetermined adsorption gas is supplied into a sample tube for accommodating a sample to obtain an adsorption amount based on an equilibrium pressure value for which an internal pressure of the sample tube reaches an equilibrium point when the adsorption gas is adsorbed onto the sample in a state where the sample tube is airtightly sealed and thus is not influenced by an outside environment and to obtain a set of measurement values (equilibrium pressure value and adsorption amount). An adsorption isotherm is obtained by plotting multiple sets of measurement values (equilibrium pressure value and adsorption amount), which are obtained by the adsorption characteristic measuring apparatus, when a relative pressure value normalized by a saturated vapor pressure of the adsorption gas is plotted on a horizontal axis and a value obtained by conversion of the adsorption amount into a volume at a standard state (0° C., 1 atm) of a gas is plotted on a vertical axis.

In the adsorption characteristic measuring apparatus, there are many connection points for connecting adsorption gas sources, sample tubes, on-off valves, and the like to each other using pipe lines. By a leak from these connection points, the inside of the sample tube may deviate from the state of being airtightly sealed in the measurement under a very low pressure. In addition, since a considerable time is required in order for the internal pressure of the sample tube to reach the equilibrium point, the amount of leakage from the outside becomes larger for a long time. Thus, there are several problems in obtaining the adsorption isotherm with accuracy under the very low relative pressure value.

An object of the invention is to provide an adsorption characteristic measuring apparatus capable of obtaining an adsorption isotherm with high accuracy under a very low relative pressure value.

According to the invention, there is provided an adsorption characteristic measuring apparatus that supplies a predetermined adsorption gas to a sample accommodated in a sample tube to measure an adsorption isotherm, the apparatus including: a refrigerant container that is filled with a constant-temperature refrigerant in which the sample tube is immersed; a sample tube fitting portion that is provided at an opening of the sample tube; an adsorption gas supply portion that supplies the adsorption gas; a gas-supply-portion fitting portion that is provided at a supply port of the adsorption gas supply portion; a pipe portion that is provided between the gas-supply-portion fitting portion and the sample tube fitting portion and includes a reference volume portion having an inner space of a predetermined reference volume, a plurality of pipes, and a plurality of on-off valves; an exhaust portion that is connected to the pipe portion through the on-off valves; a reference-volume-portion pressure gauge that detects a pressure value of the reference volume portion; a sample tube pressure gauge that detects an internal pressure of the sample tube; and a measurement controller that performs opening/closing control of the plurality of on-off valves according to predetermined steps and measures an adsorption isotherm based on the internal pressure value of the sample tube and the pressure value of the reference volume portion, wherein the measurement controller obtains a plurality of sets of measurement values (true equilibrium pressure value and true adsorption amount) to calculate the adsorption isotherm by including: a unit-time leak pressure value acquiring portion that acquires a unit-time leak pressure value which is a pressure increase value per a unit time of the internal pressure value of the sample tube caused by a non-adsorption gas leaking from the outside of the sample tube fitting portion into an inner space of the sample tube in a state where the sample tube is sealed after the inside of the sample tube is exhausted; a measured equilibrium pressure value acquiring portion that acquires a pressure value at which a temporal change of the internal pressure value of the sample tube assumes an equilibrium state when an adsorption gas present in the reference volume portion is supplied into the sample tube, the inside of which is exhausted, and the sample cube is in a closed state; a true equilibrium pressure value calculating portion that calculates a pressure value after correction of a real leak pressure value is performed on a measured equilibrium pressure value, as a true equilibrium pressure value, the real leak pressure value being obtained in such a manner that the unit-time leak pressure value is multiplied by a leak time; and a true adsorption amount calculating portion that calculates an adsorption amount of the adsorption gas on the sample under the true equilibrium pressure value based on the pressure value of the reference volume portion and the true equilibrium pressure value.

In the adsorption characteristic measuring apparatus according to the invention, the measurement controller may include a measured equilibrium pressure value estimating portion that estimates the measured equilibrium pressure value from the internal pressure values at a plurality of times to be acquired with respect to the temporal change of the internal pressure values of the sample tube, within a given time from when the adsorption gas present in the reference volume portion is supplied into the sample tube and the sample tube is in the closed state, and the true equilibrium pressure value calculating portion may calculate a pressure value after the correction of the real leak pressure value is performed on the estimated measured equilibrium pressure value, as a true equilibrium pressure value.

In the adsorption characteristic measuring apparatus according to the invention, the measurement controller may execute steps, which are predetermined steps for obtaining each of the plurality of measured equilibrium pressure values corresponding to the plurality of sets of measurement values (true equilibrium pressure value and true adsorption amount), of: first, a reference volume portion exhausting process that exhausts the inner space of the reference volume portion in such a manner that the on-off valve between the reference volume portion and the sample tube fitting portion is closed and the on-off valve between the reference volume portion and the exhaust portion is opened; an adsorption gas introducing process that introduces the adsorption gas to the inner space of the reference volume portion to close the on-off valve between the adsorption gas supply portion and the reference volume portion in such a manner that the on-off valve between the reference volume portion and the sample tube fitting portion is closed and the on-off valve between the adsorption gas supply portion and the reference volume portion is opened; and an adsorption gas supply process that opens the on-off valve between the reference volume portion and the sample tube fitting portion and supplies the adsorption gas of the reference volume portion to the sample tube so that the internal pressure value of the sample tube increases and the pressure value of the reference volume portion reduces to match each other, and that closes the on-off valve between the reference volume portion and the sample tube fitting portion to set the sample tube to be in a sealed state at a time point when the internal pressure value of the sample tube lowers to a vicinity of a predetermined target equilibrium pressure value in the course where the internal pressure value of the sample tube and the pressure value of the reference volume portion lower at the same time after the matching, and the measurement controller may acquire a pressure value, at which a temporal change of the internal pressure value of the sample tube is stable to be in an equilibrium state within a given temporal change variation range with the lapse of time under the sealed state of the sample tube, as a measured equilibrium pressure value.

In the adsorption characteristic measuring apparatus according to the invention, the adsorption characteristic measuring apparatus may further include: a measurement mode setting portion through which a user sets a measurement mode of: a very low pressure and high accuracy measurement mode at which the adsorption isotherm is obtained based on the true equilibrium pressure value after the correction of the real leak pressure value is performed on the measured equilibrium pressure value; a very low pressure measurement mode at which the adsorption isotherm is obtained using the measured equilibrium pressure value before the correction of the real leak pressure value is performed; and a very low pressure and high speed measurement mode at which the adsorption isotherm is obtained based on the pressure value after the correction of the real leak pressure value is performed on the estimated measured equilibrium pressure value.

In the adsorption characteristic measuring apparatus according to the invention, the gas-supply-portion fitting portion and the sample tube fitting portion may be joints that are used such that metal surfaces are airtightly held by being butted on each other.

In the adsorption characteristic measuring apparatus according to the invention, the adsorption gas supply portion may supply a steam gas by water in the liquid vessel accommodated in a constant-temperature tank, the gas-supply-portion fitting portion may be attached to the supply port of the liquid vessel, the refrigerant filled in the refrigerant container may be maintained at a constant temperature lower than a temperature of the constant-temperature tank by a predetermined temperature difference, and on the liquid level of the refrigerant in the refrigerant container, a heat insulating material may be disposed.

According to the adsorption characteristic measuring apparatus having the above configuration, there is calculated the unit-time leak pressure value, which is the pressure increase value per unit time of the internal pressure value of the sample tube caused by the non-adsorption gas leaking from the outside of the sample tube fitting portion into the inner space of the sample tube in the state where the sample tube is sealed after the inside of the sample tube is exhausted, and the pressure value after the correction of the real leak pressure value is performed on the measured equilibrium pressure value is calculated as the true equilibrium pressure value, the real leak pressure value being obtained in such a manner that the unit-time leak pressure value is multiplied by the leak time. In this way, since the leak from the outside is corrected, it is possible to obtain the adsorption isotherm with high accuracy under the very low relative pressure value.

Further, according to the adsorption characteristic measuring apparatus, the measured equilibrium pressure value is estimated from the internal pressure values at a plurality of times to be obtained with respect to the temporal change of the internal pressure values of the sample tube. Thus, since the real leak pressure value can be corrected using the estimated measured equilibrium pressure value obtained in a short time even without being measured up to the real equilibrium point, it is possible to obtain the adsorption isotherm with high accuracy at high speed in a short time under the very low relative pressure value.

Further, according to the adsorption characteristic measuring apparatus, as a predetermined step for obtaining each of the plurality of measured equilibrium pressure values, first, the processing step of exhausting the reference volume portion is executed, which exhausts the inner space of the reference volume portion in such a manner that the on-off valve between the reference volume portion and the sample tube fitting portion is closed and the on-off valve between the reference volume portion and the exhaust portion is opened. Thus, since the leak amount of the reference volume portion can be ignored, it is possible to obtain the adsorption isotherm with high accuracy under the very low relative pressure value.

Further, according to the adsorption characteristic measuring apparatus, the user can set the measurement mode between the very low pressure and high accuracy measurement mode that is used to perform the correction of the real leak pressure value and obtain the adsorption isotherm and the very low pressure measurement mode that is used to obtain the adsorption isotherm without performing the correction of the real leak pressure value. For example, since the user can set the very low pressure and high speed measurement mode when the adsorption isotherm needs to be viewed by the measured pressure value and can set the very low pressure and high accuracy measurement mode when the adsorption isotherm needs to be viewed by high accuracy under the very low relative pressure value, it is convenient for the user.

Moreover, according to the adsorption characteristic measuring apparatus, since the user can set the very low pressure and high speed measurement mode that is used to perform the correction of the real leak pressure value on the estimated measured equilibrium pressure value and obtain the adsorption isotherm, it is convenient for the user who wants to see the adsorption isotherm with high accuracy in a short time.

According to the adsorption characteristic measuring apparatus, the gas-supply-portion fitting portion and the sample tube fitting portion are the joints that are used such that the metal surfaces are airtightly held by being butted on each other. Thus, the gas is not released from the material of the joint and the adsorption isotherm can be obtained with higher accuracy.

According to the adsorption characteristic measuring apparatus, when the adsorption gas is the steam gas, the steam gas generated from water in the liquid vessel accommodated in the constant-temperature tank is supplied, the gas-supply-portion fitting portion is attached to the supply port of the liquid vessel, the refrigerant filled in the refrigerant container is maintained at the constant temperature lower than the temperature of the constant-temperature tank by the predetermined temperature difference, and the heat insulating material is disposed on the liquid level of the refrigerant in the refrigerant container. Thus, it is possible to obtain the adsorption isotherm with high accuracy under the very low relative pressure value.

BRIEF DESCRIPTION OF DRAWINGS

FIG. 2 is a flowchart illustrating measurement steps in the adsorption characteristic measuring apparatus according to the embodiment of the invention.

DETAILED DESCRIPTION

Figure 1:
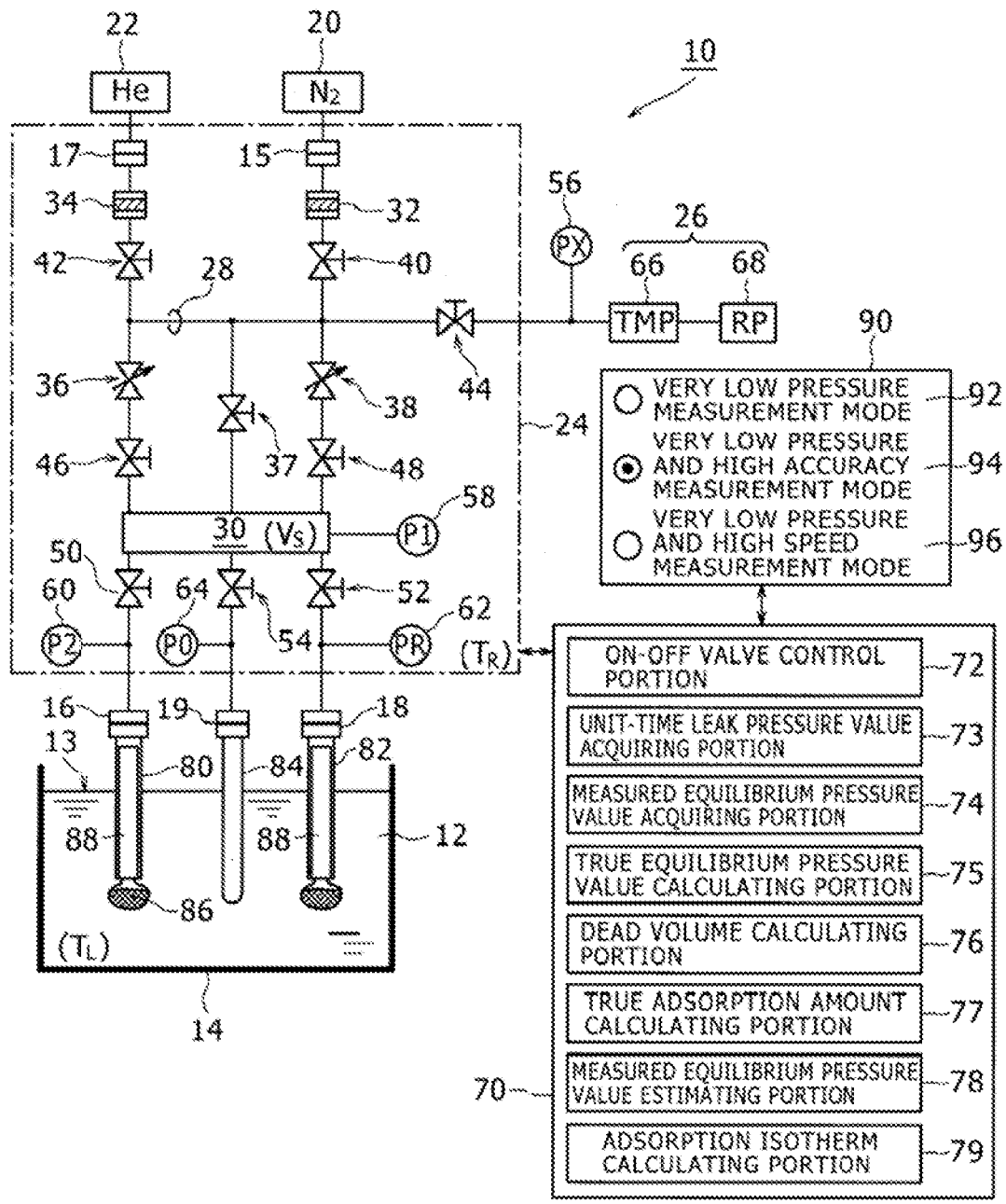
FIG. 1 is a configuration diagram of an adsorption characteristic measuring apparatus according to an embodiment of the invention.

A detailed description of an embodiment of the present invention will hereinafter be given with reference to the drawings. In the following description, a powder will be mainly used as a measuring object.

In addition, a nitrogen gas is employed as an adsorption gas in the following description, but a steam gas, an organic gas, an organic solvent gas, or other gases may be employed. As a specific example, in a case where a zeolite powder having micropores, mesopores, and macropores is used as a measuring object and the steam gas is employed as an adsorption gas, the drawings and the like will be described anew. Furthermore, it is assumed that a dead volume is calculated using a helium gas which is not adsorbed onto a sample even at a nitrogen adsorption temperature. However, an internal volume of a sample tube and a volume defined by an outer shape of the sample are measured in advance and a difference between the internal volume and the volume may be used as a dead volume. The volume of the sample may be obtained from a true density of the sample and a mass of the sample.

Shapes, dimensions, materials, temperature values, pressure values, and the like to be described below are merely examples and can be appropriately changed according to specifications of the adsorption characteristic measuring apparatus. In the following description, corresponding components are denoted by the same reference numerals in all of the drawings and description thereof will not be repeated.

FIG. 1 is a configuration diagram of an adsorption characteristic measuring apparatus 10. In FIG. 1, two sample tubes 80 and 82 attached to the adsorption characteristic measuring apparatus 10 are illustrated. The sample tube 80 is a measurement sample tube in which a powder sample 86 is accommodated. The sample tube 82 is a reference tube that is used to correct the influence according to gradual lowering of a liquid level 13 of a refrigerant 12 during the measurement period. The powder sample 86 is not disposed in the sample tube 82.

Each of the sample tubes 80 and 82 is an elongated sample container in which one end has an end opening and the other end as a bottom has a pot-like sample accommodation portion having a slightly increasing diameter through a narrowed portion. As such sample tubes 80 and 82, a glass sample tube having uniform outer and inner diameters can be used except for the narrowed portion and the sample accommodation portion. By way of example, each of the sample tubes 80 and 82 has dimensions of the uniform shape where the inner diameter is about 7 mm, the outer diameter is about 9 mm, and a length is about 235 mm. Depending on the purpose of measurement, a sample tube made of quartz or Pyrex (registered trademark) may be used.

The powder sample 86 is a solid powder having pores and having properties of adsorbing the adsorption gas. A glass rod 88 disposed in each of the sample tubes 80 and 82 is a dead volume reducing rod that is inserted into each of the sample tubes 80 and 82 to reduce an internal dead volume of each of the sample tubes 80 and 82. An outer diameter of the glass rod 88 is slightly smaller than the inner diameter of each of the sample tubes 80 and 82 and is disposed using the narrowed portion as a support portion at the end opening side above the narrowed portion in each of the sample tubes 80 and 82. With respect to a dead volume, a measurement method thereof and the like will be described below. Although not illustrated in the drawings, a scattering-prevention filter of the powder sample is provided.

The adsorption characteristic measuring apparatus 10 is configured to include: a refrigerant container 14 that is filled with the constant-temperature refrigerant 12; fitting portions 16 and 18 that are provided at the openings of the sample tubes 80 and 82, respectively; an adsorption gas supply source 20 from which a nitrogen gas serving as an adsorption gas is supplied; a helium gas source 22 from which a helium gas is supplied to determine the dead volume; a pipe portion 24 including a plurality of on-off valves and pressure gauges; an exhaust pump 26; and a measurement controller 70.

The refrigerant container 14 is a Dewar vessel in which the sample tubes 80 and 82 and a saturated vapor pressure pipe 84 are disposed at the inner space and the refrigerant 12 is filled around the sample tubes 80 and 82 and the saturated vapor pressure pipe 84 to maintain the sample tubes 80 and 82 and the saturated vapor pressure pipe 84 at a predetermined constant temperature, the sample tubes 80 and 82 and the saturated vapor pressure pipe 84 being immersed into the refrigerant 12 of a temperature $T_L$. In FIG. 1, the liquid level 13 of the refrigerant 12 related to the dead volume of the sample tubes 80 and 82 is illustrated. The type of the refrigerant 12 is selected according to the type of the adsorption gas. However, when the adsorption gas is a nitrogen gas, the refrigerant 12 is preferably liquid nitrogen. In this case, the predetermined constant temperature $T_L$ is 77K. The saturated vapor pressure pipe 84 is a pipe that is filled with the adsorption gas and is provided to always detect the saturated vapor pressure of the adsorption gas at the predetermined constant temperature during the measurement period. When the adsorption gas is the nitrogen gas, the saturated vapor pressure pipe 84 always detects a saturated vapor pressure $P_0$ at the temperature of 77K. In some cases, water can be used as the refrigerant 12 as described below, and an organic solvent or the like can be used for the refrigerant 12 as another example.

The fitting portions 16 and 18 are connection joints that are used to connect the end openings of the sample tubes 80 and 82 with sample-tube connection ports of the pipe portion 24, respectively. In the related art, the sample tubes are connected to the pipe portion using, for example, an electromagnetic valve and a coupling joint, but since a rubber material or a plastic material is used for a sealing material, a gas released by such a sealing material has an influence on the measurement. For example, due to the released gas, the insides of the sample tubes cannot be sufficiently exhausted, the degree of ultimate vacuum does not reach a sufficiently low pressure, or accuracy of the adsorption isotherm under a very low relative pressure is reduced by the influence of the released gas during the adsorption measurement.

Therefore, as the fitting portions 16 and 18, a rubber material or a plastic material is not used, but joints are used such that metal surfaces are airtightly held by being butted on each other. As these fitting portions 16 and 18, VCR (registered trademark) made by CAJON company can be used.

The adsorption gas supply source 20 indicated as $N_2$ in FIG. 1 is an adsorption gas supply portion that supplies the adsorption gas for measuring adsorption characteristics to the powder, which is the sample 86. Herein, since the adsorption gas is a nitrogen gas, the adsorption gas supply source 20 is a nitrogen gas cylinder. The supply pressure thereof is about 0.2 MPa (abs), for example. A fitting portion 15 is provided on a supply port of the adsorption gas supply source 20.

The helium gas source 22 indicated as He in FIG. 1 is a gas cylinder filled with a helium gas used to measure the dead volume of the sample tubes 80 and 82. The supply pressure thereof is about 0.2 MPa (abs), for example. In the measurement of the dead volume when the adsorption gas is the nitrogen gas, it is necessary to use an inert gas which is not adsorbed onto the sample tubes 80 and 82 even at a nitrogen adsorption temperature, and the helium gas is suitable for such a purpose. A fitting portion 17 is provided on a supply port of the helium gas source 22.

As the fitting portions 15 and 17, a rubber material or a plastic material is not used, but joints are used such that metal surfaces are airtightly held by being butted on each other. As these fitting portions 15 and 17, VCR (registered trademark) can be used in the same manner as for the fitting portions 16 and 18. Since the fitting portion 16 provided at the opening of the sample tube 80 and the fitting portion 15 provided at the supply port of the adsorption gas supply source 20 are involved in a leak (to be described below) through which a non-adsorptive gas or the like enters into the sample tube 80 from the outside, the fitting portion 16 is referred to as a sample tube fitting portion and the fitting portion 15 is referred to as a gas-supply-portion fitting portion, when the fitting portion 15 is distinguished from the fitting portion 16.

The pipe portion 24 is configured by a plurality of pipes that are used to connect the sample tubes 80 and 82, the adsorption gas supply source 20, the helium gas source 22, and the exhaust pump 26 with each other through a gas reservoir 28 and a reference volume portion 30 provided therebetween. The pipe portion 24 includes: two flow-rate regulating valves 36 and 38 that are configured to manually set flow rates together with filters 32 and 34; nine on-off valves 37 and 40 to 54 that are opened and closed under the control of the measurement controller 70; and five pressure gauges 56 to 64. Among these, the pressure gauge 56 is a vacuum gauge, which is disposed outside of the pipe portion 24.

The pressure gauge 58 is configured by two pressure sensors having separate measurement ranges of 1.33 kPa (10 Torr) and 133.3 kPa (1000 Torr), respectively. The pressure gauge 60 is configured by three pressure sensors having separate measurement ranges of 13.3 Pa (0.1 Torr), 1.33 kPa (10 Torr), and 133.3 kPa (1000 Torr), respectively. Alternatively, a pressure sensor having three measurement ranges of 2.66 Pa (0.02 Torr), 266 Pa (2 Torr), and 133.3 kPa (1000 Torr) may be used to measure a very low pressure value. Each of the pressure gauges 62 and 64 is a pressure sensor having a measurement range of 133.3 kPa (1000 Torr).

In the two flow-rate regulating valves 36 and 38 and the on-off valves 37 and 40 to 54, an air actuating valve is used instead of an electromagnetic valve. This makes it possible to reduce the released gas from the two flow-rate regulating valves 36 and 38 and the on-off valves 37 and 40 to 54 and to perform the adsorption characteristic measurement with high accuracy. In order to ensure the adsorption characteristic measurement with high accuracy, the entirety of the pipe portion 24 is accommodated in a temperature-adjusted bath and is maintained at a predetermined reference temperature $T_R$.

In the pipe portion 24, the filter 32 and the on-off valve 40 are connected to each other in series between the adsorption gas supply source 20 and the gas reservoir 28. Similarly, the filter 34 and the on-off valve 42 are connected to each other in series between the helium gas source 22 and the gas reservoir 28. The filters 32 and 34 are filtration units for removing foreign substances contained in the helium gas and the nitrogen gas.

The gas reservoir 28 is a pipe line that is used as a gas supply buffer when the nitrogen gas and the helium gas are supplied toward the sample tubes 80 and 82 from the adsorption gas supply source 20 and the helium gas source 22, respectively, and is used as an exhaust buffer when the insides of the sample tubes 80 and 82 are exhausted.

The gas reservoir 28 is connected to the exhaust pump 26 through the on-off valve 44. The pressure gauge 56 serving as the vacuum gauge is an exhaust pressure detecting portion for detecting a pressure value PX of a gas to be exhausted from the gas reservoir 28 when the on-off valve 44 is opened.

The two flow-rate regulating valves 36 and 38 and the two on-off valves 46 and 48 provided between the gas reservoir 28 and the reference volume portion 30 have a function of circulating the gas while adjusting the flow rate between the gas reservoir 28 and the reference volume portion 30. Herein, a pipe line through which the flow-rate regulating valve 36 and the on-off valve 46 are connected to each other in series and a pipe line through which the flow-rate regulating valve 38 and the on-off valve 48 are connected to each other in series are disposed in parallel with each other. The flow-rate regulating valve 36 is a rough flow-rate regulating valve that roughly adjusts the flow rate of the gas flowing between the gas reservoir 28 and the reference volume portion 30, and the flow-rate regulating valve 38 is a fine flow-rate regulating valve that finely adjusts the flow rate of the gas flowing between the gas reservoir 28 and the reference volume portion 30. The on-off valves 46 and 48 are valves for switching the on-off state of the valve. It is possible to appropriately adjust the flow rate of the gas between the gas reservoir 28 and the reference volume portion 30 by setting the degree of opening of two flow-rate regulating valves 36 and 38 and controlling the on-off states of the two on-off valves 46 and 48 and to set a pressure value P1 of the reference volume portion 30 to a desired initial pressure. For example, when the on-off valve 46 is opened for a predetermined time while the on-off valve 48 is closed, the rough adjustment of the pressure value P1 of the reference volume portion 30 can be performed, and then when the on-off valve 48 is opened for a predetermined time while the on-off valve 46 is closed, fine adjustment of the pressure value P1 of the reference volume portion 30 can be performed.

The on-off valve 37 provided between the gas reservoir 28 and the reference volume portion 30 is a bypass valve. For example, the on-off valve 37 is turned on when the gas reservoir 28 and the reference volume portion 30 need to be evacuated to a predetermined degree of a vacuum during the setting of an initial state. The on-off valves 46 and 48, together with the on-off valve 37, block or circulate the gas flow between the gas reservoir 28 and the reference volume portion 30, but the on-off valve 37 is opened for the purpose of the high-speed exhaust and the on-off valves 46 and 48 are opened when the adsorption gas or the helium gas is supplied to the reference volume portion 30 or the like. Since the sample 86 is a powder, the powder may be scattered when the inside of the sample tube 80 is rapidly exhausted by the on-off valve 37. In such a case, the on-off valves 46 and 48 are used for the purpose of the exhaust instead of the on-off valve 37 to gently exhaust the inside of the sample tube 80. The opening degree of the flow-rate regulating valve 36 serving as the rough flow-rate regulating valve is set to the extent that the powder is not scattered when the on-off valve 46 connected to the flow-rate regulating valve 36 in series is opened to exhaust.

The reference volume portion 30 is used as a space into which the helium gas from the helium gas source 22 is temporarily introduced when being supplied to either of the sample tubes 80 and 82 to measure the dead volume. In addition, the reference volume portion 30 is used as a space into which the nitrogen gas from the adsorption gas supply source 20 is temporarily introduced when being supplied to either of the sample tubes 80 and 82 through the gas reservoir 28 to measure adsorption characteristics. The on-off valve 54 is opened when the nitrogen gas is introduced to the reference volume portion 30 and thus the nitrogen gas is filled in the saturated vapor pressure pipe 84. In this way, the volume of the pipe line of the reference volume portion 30 is a reference volume $V_S$ at the time of the supply of the helium gas for the measurement of the dead volume and a reference volume $V_S$ at the time of the supply of the nitrogen gas for the measurement of the adsorption characteristics. A temperature of the reference volume portion 30 is a reference temperature $T_R$ at which the pipe portion 24 is maintained by the temperature-adjusted bath. As an example, the reference volume $V_S$ is about 25 ml, and the reference temperature $T_R$ is 40° C. The pressure gauge 58 is a pressure detecting portion of the reference volume portion that detects the internal pressure value P1 of the reference volume portion 30.

In the pipe portion 24, the on-off valves 50 and 52 are connected to the pipes provided between the sample tubes 80 and 82 and the reference volume portion 30, respectively, and the on-off valve 54 is connected to the pipe provided between the saturated vapor pressure pipe 84 and the reference volume portion 30. To describe the sample tube 80, a pipe for the sample tube 80 is configured in such a manner that the on-off valve 50 is connected to one end, which is defined as the fitting portion 16 attached to the end opening of the sample tube 80, and the other end, which is defined as a connection port provided in the reference volume portion 30, in series. The pressure gauge 60 is a sample-tube pressure detecting portion that is connected to the pipe between the fitting portion 16 and the on-off valve 50 to detect an internal pressure value P2 of the sample tube 80.

Similarly, a pipe for the sample tube 82 is configured in such a manner that the on-off valve 52 is connected to the fitting portion 18 attached to the end opening of the sample tube 82 and the reference volume portion 30 in series. The pressure gauge 62 is a reference-tube pressure detecting portion that is connected to the pipe between the fitting portion 18 and the on-off valve 52 to detect an internal pressure value PR of the sample tube 82, which is a reference tube. Since the detection value of the pressure gauge 62 is related to a magnitude of the liquid level 13 of the liquid nitrogen serving as the refrigerant 12 which gradually lowers by evaporation evaporated during the measurement period, the calculation of the dead volume is corrected based on the detection value.

VCR (registered trademark) similar to the fitting portions 16 and 18 or Swagelok (registered trademark) made by Crawford Fitting company is attached to the end opening of the saturated vapor pressure pipe 84, serving as a joint. The on-off valve 54 is connected to the joint and the reference volume portion 30 in series, thereby forming a pipe for the saturated vapor pressure pipe 84. The pressure gauge 64 is a saturated-vapor-pressure-tube pressure detecting portion that detects the pressure value P0 of the nitrogen gas serving as the adsorption gas supplied to the saturated vapor pressure pipe 84 at the temperature of 77K.

The exhaust pump 26 is an exhaust apparatus for reducing an internal pressure of the sample tubes 80 and 82 through the reference volume portion 30 and the gas reservoir 28. The exhaust pump 26 can be used in combination of a turbo molecular pump 66 indicated as TMP in FIG. 1 and a rotary pump 68 indicated as RP. The rotary pump 68 continues to actuate in use of the adsorption characteristic measuring apparatus 10, but the turbo molecular pump 66 is operated under the control of the measurement controller 70.

The measurement controller 70 is a controller having functions of controlling the on-off states of the on-off valves 37 and 40 to 54 in the pipe portion 24 and measuring the adsorption characteristics using the detection values of the pressure gauges 58 to 64. Such a measurement controller 70 can be configured by a suitable computer.

The measurement controller 70 is configured to include: an on-off valve control portion 72 that controls opening and closing of the on-off valves 37 and 40 to 54; a unit-time leak pressure value acquiring portion 73 that acquires a unit-time leak pressure value corresponding to the amount of leak of a non-adsorptive gas from the outside into the sample tube 80; a measured equilibrium pressure value acquiring portion 74 that acquires an equilibrium pressure value by measurement when an internal pressure of the sample tube 80 is varied to reach equilibrium by adsorption; a true equilibrium pressure value calculating portion 75 that calculates a pressure value obtained by correcting the measured equilibrium pressure value using a real leak pressure value obtained in such a manner chat the unit-time leak pressure value is multiplied by a leak time, as a true equilibrium pressure value; a dead volume calculating portion 76 that calculates a volume of a dead volume portion at the sample tube 80 side from the fitting portion 16; a true adsorption amount calculating portion 77 that calculates the amount of adsorption gas adsorbed onto the sample 86 based on the true equilibrium pressure value; a measured equilibrium pressure value estimating portion 78 that estimates the measured equilibrium pressure value; and an adsorption isotherm calculating portion 79 that calculates an adsorption isotherm.

These functions of the measurement controller 70 can be implemented in such a manner that the measurement controller 70 executes software. Specifically, the functions can be implemented when the measurement controller 70 executes an adsorption characteristics measuring program. Some of these functions may be implemented by hardware.

A measurement mode setting portion 90 is connected to the measurement controller 70 and is a setting button or a setting screen by which a measurement mode can be set by a user to calculate the adsorption isotherm. Here, the user can set one mode of three measurement modes configured by: a very low pressure measurement mode 92 that is used to obtain the adsorption isotherm using the measured equilibrium pressure value before the correction of the real leak pressure value; a very low pressure and high accuracy measurement mode 94 that is used to obtain the adsorption isotherm based on the true equilibrium pressure value acquired after the correction of the real leak pressure value with respect to the measured equilibrium pressure value; and a very low pressure and high speed measurement mode 96 that is used to obtain the adsorption isotherm baaed on the pressure value acquired after the correction of the real leak pressure value with respect to the measured equilibrium pressure value which has been estimated. FIG. 1 illustrates a case where the very low pressure and high accuracy measurement mode 94 is set by the user, as an example.

It is considered that one mode of three measurement modes is set as follows. For example, the user sets the very low pressure measurement mode 92 when the measurement of the adsorption isotherm needs to be viewed. The user sets the very low pressure and high accuracy measurement mode when the adsorption isotherm under the very low relative pressure value needs to be viewed by the true equilibrium pressure value. The user sets the very low pressure and high speed measurement mode when a high accuracy adsorption isotherm needs to be viewed in a short time.

The very low pressure value and the very low relative pressure value are distinguished from each other in that: a measured pressure value P2 of the pressure gauge 60 under the very low pressure is the very low pressure value; and a relative pressure value obtained by normalization of the very low pressure value P2 with the saturated vapor pressure of the adsorption gas is the very low relative pressure value. A horizontal axis of the adsorption isotherm is taken at a relative pressure value rather than a real pressure value, but the very low relative pressure value is $10^{-5}$ or less in the case of the adsorption isotherm measurement of the nitrogen gas at a temperature of 77K, for example.

Operation and effect of the adsorption characteristic measuring apparatus 10 having such a configuration, and particularly, each function of the measurement controller 70 and the measurement mode setting portion 90 will be described in more detail with reference to a flowchart of FIG. 2 and FIG. 3A and the subsequent drawings.

FIG. 2 is a flowchart illustrating measurement steps in the adsorption characteristic measuring apparatus 10. Each of the steps corresponds to a respective processing step of the adsorption characteristics measuring program. When the adsorption characteristics measuring program starts up, the measurement modes are set by the user (S10). The measurement modes are three modes of the very low pressure measurement mode 92, the very low pressure and high accuracy measurement mode 94, and the very low pressure and high speed measurement mode 96. The user can set one of the three modes. In an example illustrated in FIG. 1, since a click button is provided for each of the measurement mode on the setting screen of the measurement mode setting portion 90, it is configured such that the output of the click button pressed by the user is changed from an L-level to an H-level, an H-level signal is detected to be the output of one of the click buttons and is then transmitted to the measurement controller 70, and thus the measurement controller 70 can acquire any measurement mode set by the user. In the example illustrated in FIG. 1, since the click button of the very low pressure and high accuracy measurement mode 94 is pressed, the output signal of this click button is the H-level, the output signals of the other click buttons remain at the L-level.

By the acquired result of the measurement mode set by the user, subsequent processes are divided into three modes of the very low pressure measurement mode 92 (S12), the very low pressure and high accuracy measurement mode 94 (S14), and the very low pressure and high speed measurement mode 96 (S16). Although the processing is divided into three modes, first, all of the measurement modes are subjected to an initialization process (S18).

In the cases of the very low pressure and high speed measurement mode 96 in step S16 and the very low pressure and high accuracy measurement mode 94 in step S14, a unit-time leak pressure value acquiring process is performed after the initialization (S20). This processing step is executed by a function of the unit-time leak pressure value acquiring portion 73 in the measurement controller 70. In the case of the very low pressure measurement mode 92 in step S12, the unit-time leak pressure value is not acquired.

After the unit-time leak pressure value is acquired, the very low pressure and high accuracy measurement mode 94 and the very low pressure and high speed measurement mode 96 proceed in different steps. In the case of the very low pressure and high accuracy measurement mode 94, a measured equilibrium pressure value acquiring process is performed (S22). In the case of the very low pressure and high speed measurement mode 96, a measured equilibrium pressure value estimating process is performed (S24). This processing step is executed by a function of the measured equilibrium pressure value estimating portion 78 in the measurement controller 70. Subsequently, in both of the very low pressure and high accuracy measurement mode 94 and the very low pressure and high speed measurement mode 96, a true equilibrium pressure value calculating process is performed (S26). The true equilibrium pressure value is an equilibrium pressure value obtained by correction of the real leak pressure value with respect to the measured equilibrium pressure value or the measured equilibrium pressure estimation value. The real leak pressure value is a value obtained in such a manner that the unit-time leak pressure value acquired in step S20 is multiplied by a leak time, which is a time until the next adsorption gas is supplied to the sample tube 80 after the previous adsorption gas is supplied to the sample tube 80, the sample tube being in a state of being airtightly sealed after previous adsorption gas is supplied. This processing step is executed by a function of the true equilibrium pressure value calculating portion 75 in the measurement controller 70. After step S26, a dead volume calculating process is performed (S28). This processing step is executed by a function of the dead volume calculating portion 76 in the measurement controller 70.

In the case of the very low pressure measurement mode 92 in step S12, the measured equilibrium pressure value acquiring process (S22) is performed, but the process directly moves to the dead volume calculating process (S28) without performance of both of the unit-time leak pressure value acquiring process (S20) and the true equilibrium pressure value calculating process (S26). In this way, since the real leak pressure value is not corrected in the very low pressure measurement mode 92, the very low pressure measurement mode 92 is suitable when the user wants to see the measurement of the adsorption isotherm.

Figure 3:
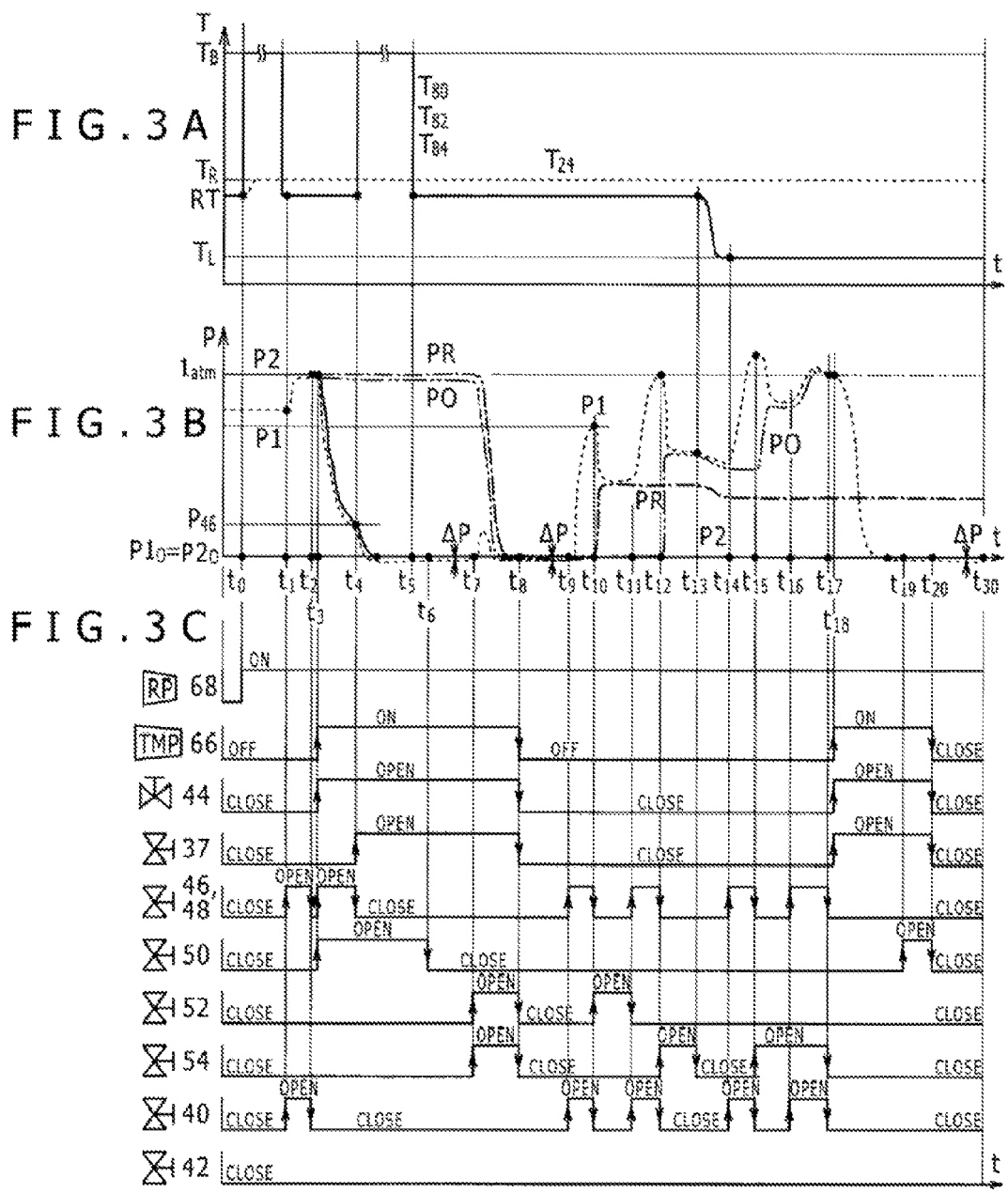
FIG. 3A is a time chart illustrating temporal change of a temperature, a pressure, an open/close state of each of on-off valves, and the like in an initialization process in FIG. 2.
FIG. 3B is a time chart illustrating temporal change of a temperature, a pressure, an open/close state of each of on-off valves, and the like in the initialization process in FIG. 2 together with FIG. 3A.
FIG. 3C is a time chart illustrating temporal change of a temperature, a pressure, an open/close state of each of on-off valves, and the like in the initialization process in FIG. 2 together with FIGS. 3A and 3B.
Figure 4:
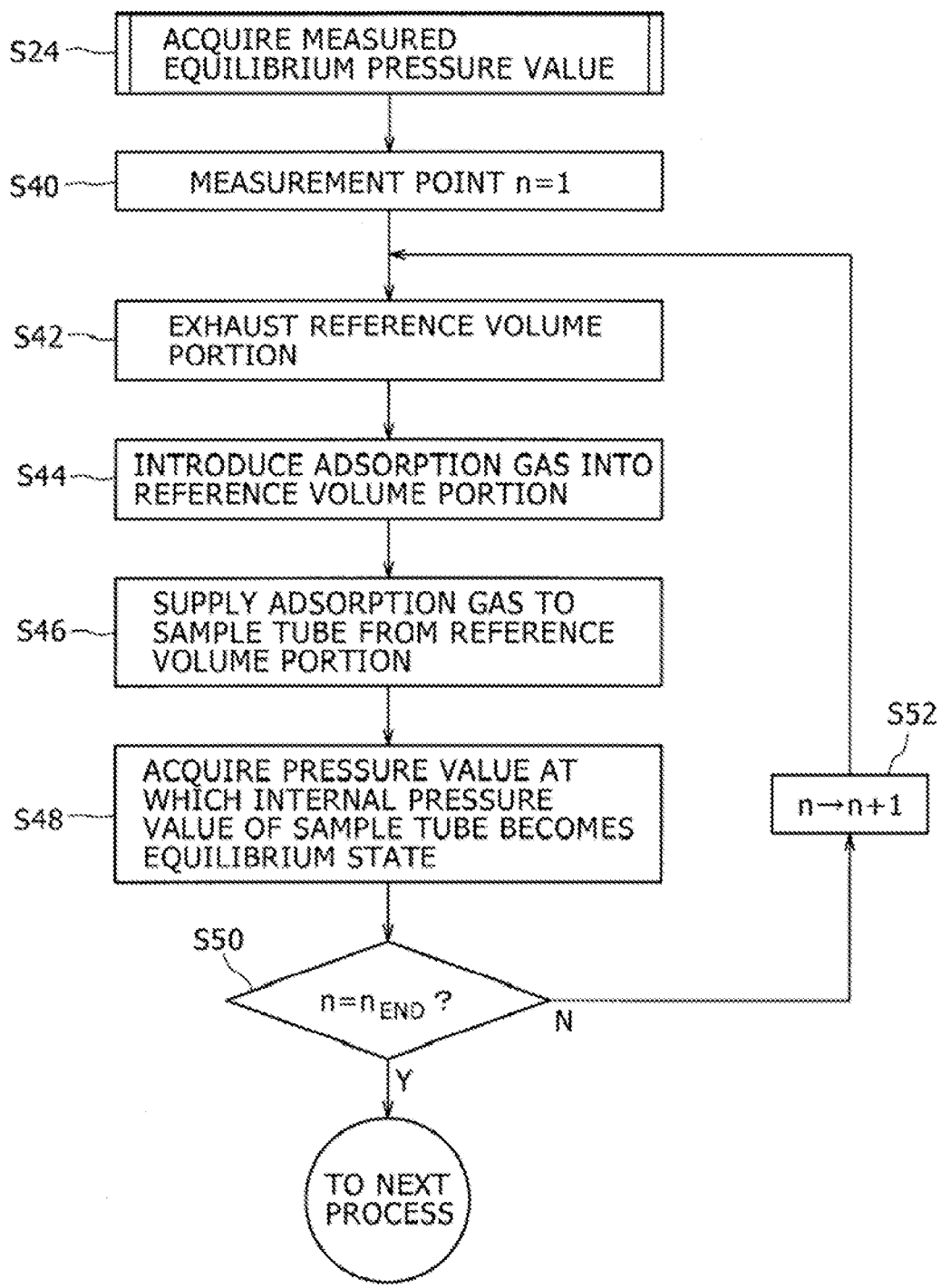
FIG. 4 is a flowchart illustrating internal processing steps of a measured equilibrium pressure value acquiring step in the flowchart of FIG. 2.
Figure 5A:
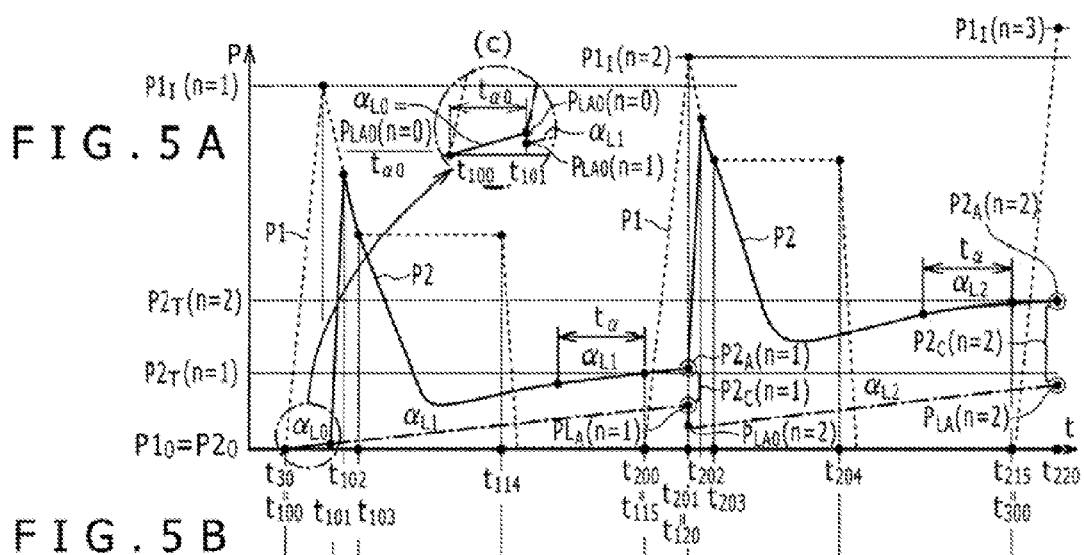
FIG. 5A is a time chart illustrating temporal change of a pressure, an open/close state of each of on-off valves, and the like in a true equilibrium pressure value calculating process in FIG. 2.
Figure 5B:
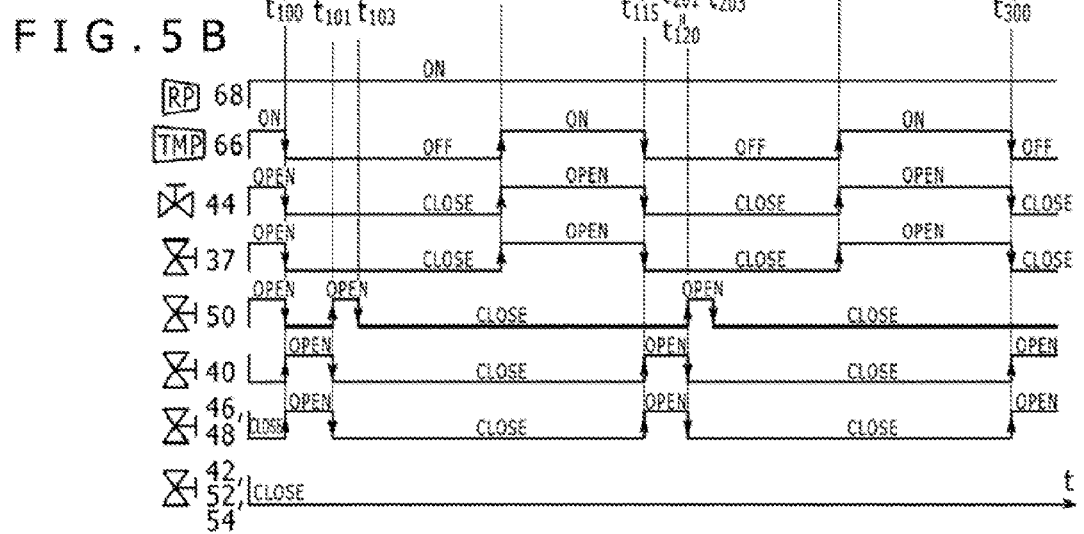
FIG. 5B is a time chart illustrating temporal change of a pressure, an open/close state of each of on-off valves, and the like in the true equilibrium pressure value calculating process in FIG. 2 together with FIG. 5A.
Figure 6A:
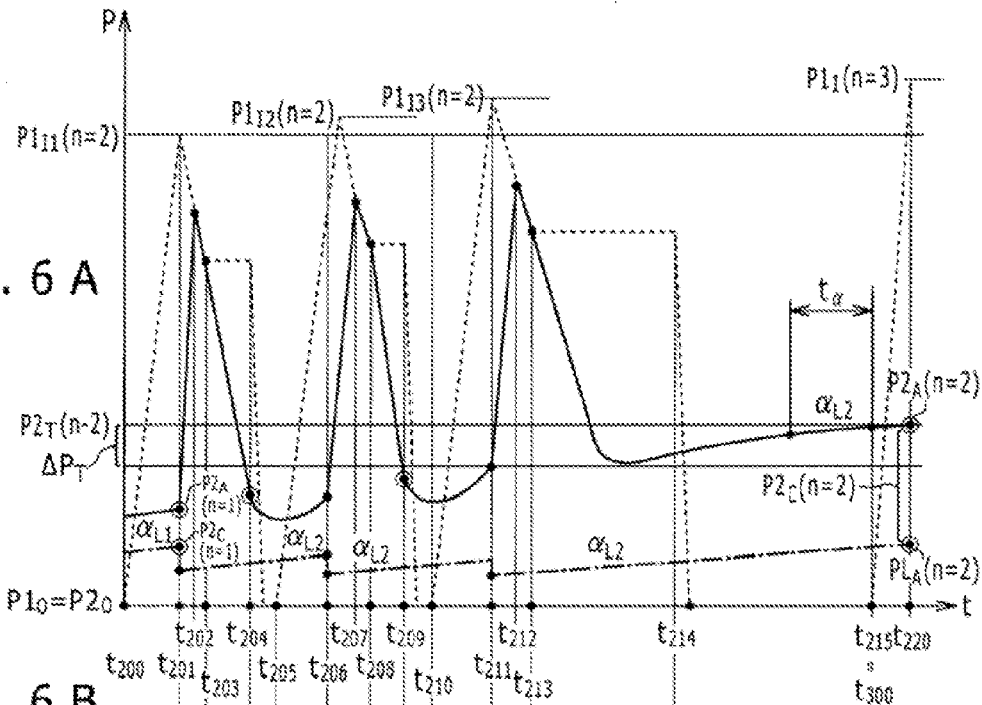
FIG. 6A is a diagram illustrating a modification example of the time charts illustrated in FIGS. 5A and 5B.
Figure 6B:
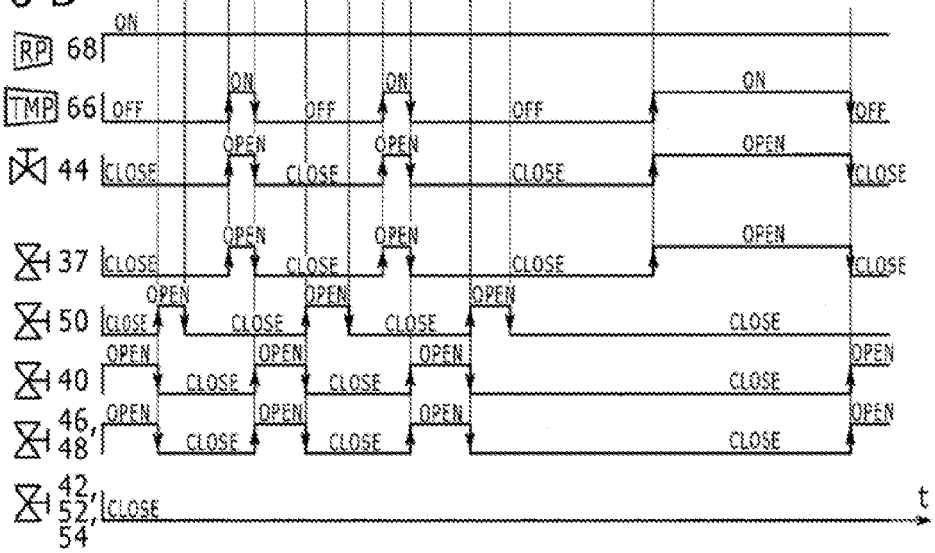
FIG. 6B is a diagram illustrating a modification example of the time charts illustrated in FIGS. 5A and 5B together with FIG. 6A.
Figure 7:
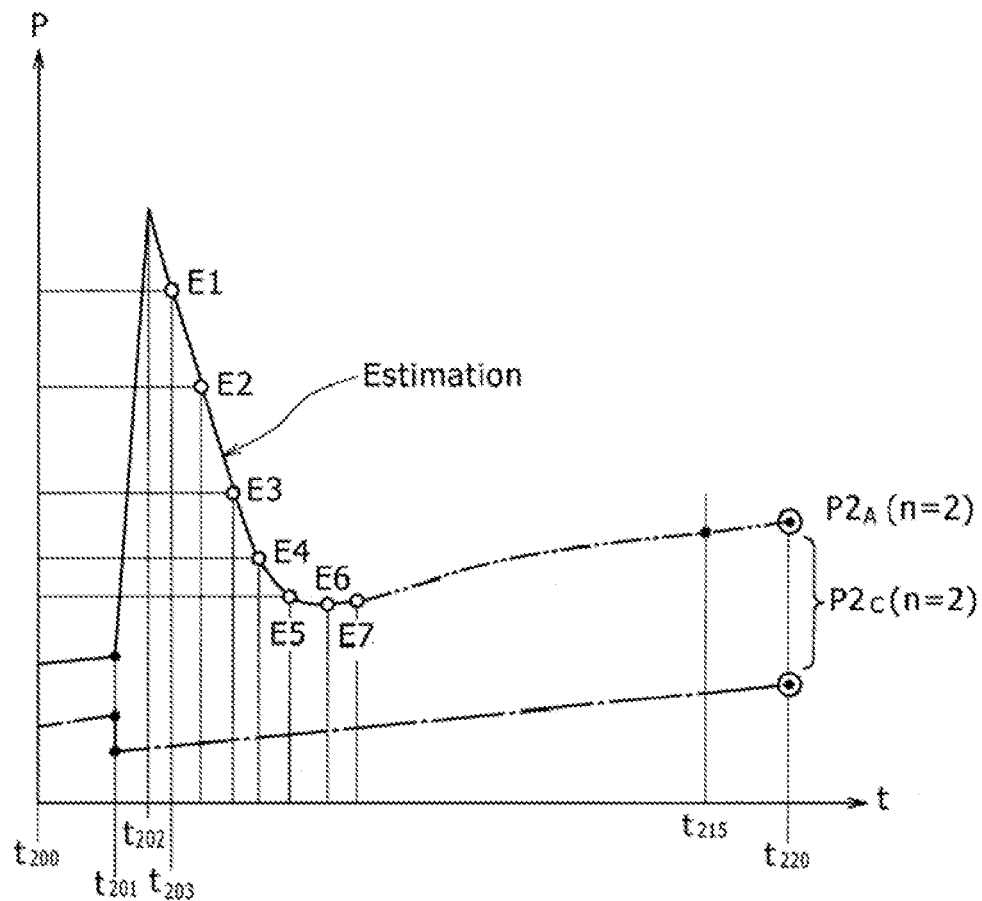
FIG. 7 is a diagram illustrating an example of a measured equilibrium pressure value estimating process in FIG. 2.
Figures 8A, 8B:
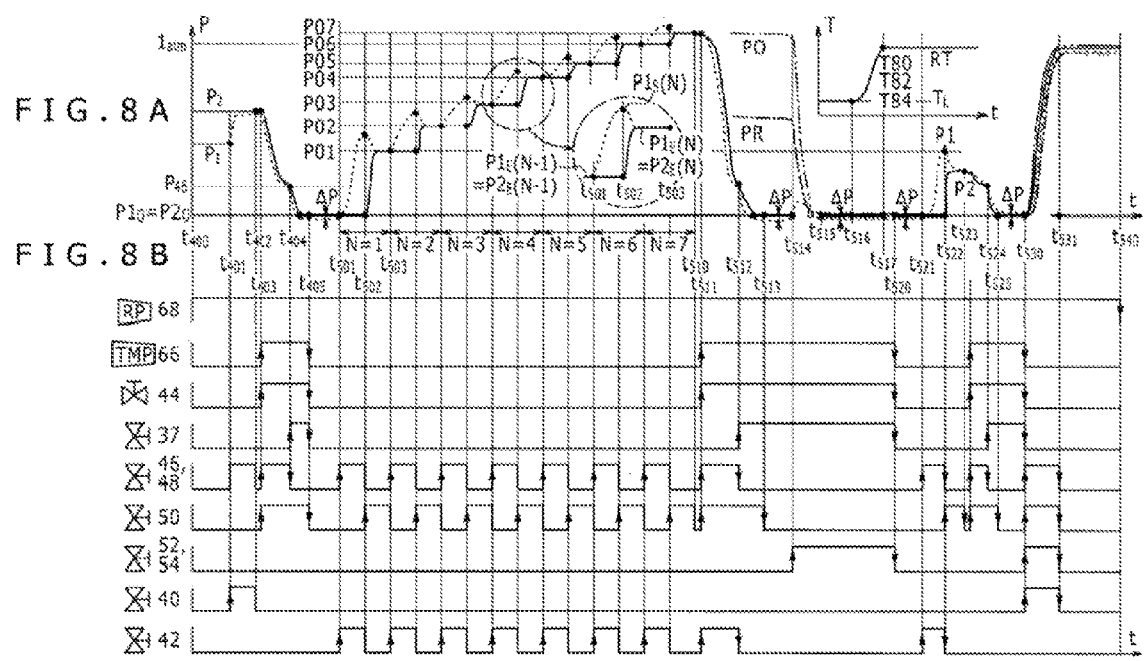
FIG. 8A is a time chart illustrating temporal change of a pressure, an open/close state of each of on-off valves, and the like in a dead volume calculating process in FIG. 2.
FIG. 8B is a time chart illustrating temporal change of a pressure, an open/close state of each of on-off valves, and the like in the dead volume calculating process in FIG. 2 together with FIG. 8A.

The processes so far will be described in more detail with reference to FIGS. 3A to 8B. FIGS. 3A to 3C are time charts with respect to an initialization process, respectively; FIG. 4 is a flowchart illustrating the measured equilibrium pressure value acquiring step; and FIGS. 5A and 5B are time charts with respect to the unit-time leak pressure value acquiring process, the measured equilibrium pressure value acquiring process, and the true equilibrium pressure value calculating process, respectively. FIGS. 6A and 6B are time charts with respect to a modification example of the measured equilibrium pressure value acquiring process, and FIG. 7 is a schematic diagram of the measured equilibrium pressure value estimating process. FIGS. 8A and 8B are time charts with respect to the dead volume calculating process.

FIGS. 3A to 3C are time charts at the time of the initialization process, respectively. In these time charts, a horizontal axis represents a time t. A vertical axis in FIG. 3A represents a temperature T, a vertical axis in FIG. 3B represents a pressure value P, and a vertical axis in FIG. 3C represents an ON/OFF state of the rotary pump 68 and the turbo molecular pump 66 constituting the exhaust pump 26 and an open/close state of the nine on-off valves 37, and 40 to 54.

FIG. 3A illustrates a temporal change of temperatures $T_{80}$ and $T_{82}$ of the sample tubes 80 and 82 and a temperature $T_{84}$ of the saturated vapor pressure pipe 84. A temperature $T_B$ is a pre-treatment temperature of the sample tubes 80 and 82 and the saturated vapor pressure pipe 84. The temperature $T_B$ varies depending on the type of sample 86, but is from about 300° C. to about 500° C. A temperature $T_R$ is 40° C., which is a reference temperature of the pipe portion 24. A temperature RT is about 25° C., which is a room temperature. A temperature $T_L$ is a temperature of the refrigerant 12 and is 77K when the refrigerant is the liquid nitrogen. Since the room temperature RT varies, the temperature $T_R$ is a temperature which is set to keep a constant temperature of the pipe portion 24 and may be considered to be substantially equal to the room temperature RT in some cases. For example, when the temperature $T_L$ is 77K, it may be considered that there is little difference between the temperature $T_R$ and the temperature RT when seen from the temperature of 77K.

FIG. 3B illustrates a temporal change of the pressure value P1 of the reference volume portion 30 detected by the pressure gauge 58, a temporal change of the pressure value P2 of the sample tube 80 detected by the pressure gauge 60, a temporal change of the pressure value PR of the sample tube 82 detected by the pressure gauge 62, and a temporal change of the pressure value P of the saturated vapor pressure pipe 84 detected by the pressure gauge 64, respectively. In this drawing, the temporal change of the pressure value P1 is represented by a broken line, the temporal change of the pressure value P2 is represented by a solid line, the temporal change of the pressure value PR is represented by a dashed-dotted line, and the temporal change of the pressure value P is represented by a dashed-two dotted line. In addition, a value of $P1_0=P2_0$ is a pressure value after the reference volume portion 30 and the sample tube 80 are sufficiently depressurized by being exhausted, and this value is an origin value of the pressure values P1 and P2. That is, the pressure values P1 and P2 are pressure values of the difference from the value of $P1_0=P2_0$.

With respect to the ON/OFF states of the rotary pump 68 and the turbo molecular pump 66, FIG. 3C illustrates the ON-state (ON), at an H-level and the OFF-state (OFF) at an L-level. With respect to each of the nine on-off valves 37, and 40 to 54, the open state (OPEN) is illustrated at an H-level and the close state (CLOSE) is illustrated at an L-level. During the initialization process, the on-off valve 42 is in a closed state. Opening/closing control of each on-off valve is executed by a function of the on-off valve control portion 72 in the measurement controller 70 according to steps illustrated in the time chart which are described below.

A time $t_0$ on the horizontal axis is a time at which the power of the adsorption characteristic measuring apparatus 10 is turned on. At this time, the rotary pump 68 is turned on. The rotary pump 68 continues to operate until the power of the adsorption characteristic measuring apparatus 10 is turned off. At this time, the sample tube 80 is also heated to the temperature $T_B$ by a rough pre-treatment apparatus, which is separately installed, and is heated for a predetermined rough pre-treatment time. The predetermined rough pre-treatment time varies depending on the type of the sample 86, but is about 12 hours as an example. The time $t_1$ is a time at which the rough pre-treatment time has finished, and the sample tube 80 is cooled during this time and is then removed from the rough pre-treatment apparatus.

Between the time $t_0$ and the time $t_1$, a temperature adjusting tank of the pipe portion 24 is operated, and the temperature of the pipe portion 24 rises from the temperature RT to the temperature $T_R$ and is maintained at the temperature $T_R$. In addition, between the time $t_0$ and the time $t_1$, the pressure gauges 58 and 60 having several measurement ranges are subjected to an adjustment called a span adjustment to reduce the error at the time of switching between different ranges. Further, the measurement mode is set by the user in the measurement mode setting portion 90.

The time $t_1$ is a time at which the initialization process starts. At this time, the sample tube 80 is connected to the fitting portion 16 connected to the pipe portion 24. The Internal pressure value P2 of the sample tube 80 is in a state of atmospheric pressure. Meanwhile, the internal pressure value P1 of the reference volume portion 30 depends on prior processing conditions, but in some cases is a low pressure different from the pressure value P2. At this time, when the on-off valve 50 is opened, there is a concern that the powder sample 86 accommodated in the sample tube 80 is scattered. Therefore, at the time $t_1$, the nitrogen gas having substantially the same components as the air is supplied to the sample tube 80 from the adsorption gas supply source 20, and the pressure P1 is subjected to a pressure raising process to be close to the pressure value P2 of the sample tube 80. That is, at the time $t_1$, the on-off valve 40 is set to be in an open state, and then the on-off valves 46 and 48 are set to be in an open state. For this reason, the pressure P1 is brought close to the pressure value P2 of the sample tube 80.

A time $t_2$ is a time at which the pressure P1 is substantially close to the pressure value P2 of the sample tube 80. At this time, the on-off valves 46 and 48 are set to be in a closed state, and then the on-off valve 40 is set to be in a closed state. At a time $t_3$ slightly elapsed from the time $t_2$, the turbo molecular pump 66 is turned on. Subsequently, the on-off valve 44 is set to be in the open state, and then the on-off valves 46 and 48 are set to be in the open state and the on-off valve 50 is set to be in the open state. Here, the on-off valves 46 and 48 can be used to moderately exhaust the inside of the sample tube 80. The pressure values P1 and P2 are slowly reduced at the same time.

A time $t_4$ is a time at which the pressure values P1 and P2 reach a predetermined low pressure value $P_{46}$. The predetermined low pressure value $P_{46}$ is set to a pressure value at which the powder sample 86 accommodated in the sample tube 80 is not scattered even when a quick exhaust is performed by the on-off valve 37. In other words, the low pressure value $P_{46}$ is a threshold pressure value for switching from the exhaust of the on-off valve 46 to the exhaust of the on-off valve 37. At the time $t_4$, the on-off valves 46 and 48 are set to be in the closed state, then the on-off valve 37 is set to be in the open state, and subsequently, the on-off valve 50 is set to be in the open state. The on-off valves 52 and 54 are in the closed state. For this reason, the pressure values P1 and P2 are rapidly reduced toward the value of $P1_0=P2_0$.

At the time prior to the time $t_4$, the refrigerant container 14 is in a lowered state and a heater not depicted in FIG. 1 is also in a lowered state. At the time $t_4$, the heater in the lowered state rises to heat the three of the sample tubes 80 and 82 and the saturated vapor pressure pipe 84 to the temperature $T_B$ and to continuously heat them during a predetermined main pre-treatment time, and thus a main pre-treatment is performed. The predetermined main pre-treatment time varies depending on the type of the sample 86, but is about six hours as an example. A time $t_5$ is a time at which the main pre-treatment time has finished, and the three of the sample tubes 80 and 82 and the saturated vapor pressure pipes 84 are cooled at this time. During the main pre-treatment time, the sample tube 80 is continuously exhausted.

A time $t_6$ appropriately elapsed from the time $t_5$ is a time at which the sample tube 80 is sufficiently depressurized together with the reference volume portion 30 and the pressure values P1 and P2 become the value of $P1_0=P2_0$ at the same time. At this time, the on-off valve 50 is set to be in the closed state, and then the on-off valves 52 and 54 are set to be in the open state. For this reason, the sample tube 80 is set to be in an airtightly sealed state while remaining substantially in a vacuum state. In this state, monitoring is performed to determine whether the pressure value P2 exceeds a predetermined variation range $\Delta P$. A time $t_7$ is a time after a predetermined monitoring period has elapsed from the time $t_6$. In the monitoring period so far, when the pressure value P2 is within the variation range of $\Delta P$ with respect to the pressure $P2_0$ ($\pm \Delta P/2$), the on-off valves 52 and 54 are set to be in the open state and the sample tube 82 and the saturated vapor pressure pipe 84 start to be exhausted.

A time $t_8$ is a time at which the pressure values PR and P0 of the sample tube 82 and the saturated vapor pressure pipe 84 become the value of $P1_0=P2_0$. At this time, the on-off valves 52 and 54 are set to be in the closed state, and then the on-off valves 37 and 44 are sequentially set to be in the closed state and the turbo molecular pump 66 is turned off. For this reason, the sample tubes 80 and 82 and the saturated vapor pressure pipe 84 are set to be in an airtightly sealed state while remaining substantially in a vacuum state. In this state, monitoring is performed to determine whether these pressure values exceed the predetermined variation range $\Delta P$. A time $t_9$ is a time after a predetermined monitoring period has elapsed from the time $t_8$. In the monitoring period so far, when these pressure values are within the variation range of $\Delta P$ with respect to the value of $P1_0=P2_0$ ($\pm \Delta P/2$), a process of filling the nitrogen gas serving as an adsorption gas into the sample tube 82 and the saturated vapor pressure pipe 84 is subsequently performed.

At the time $t_9$, the on-off valve 40 is set to be in the open state, and then the on-off valves 46 and 48 are set to be in the open state. The on-off valves 50, 52, and 54 remain in the closed state. For this reason, the nitrogen gas is gradually filled into the reference volume portion 30 from the adsorption gas supply source 20 and reaches a given gas pressure. At a time $t_{10}$ when the nitrogen gas reaches the given gas pressure, the on-off valves 46 and 48 are set to be in the closed state, and then the on-off valve 40 is set to be in the closed state. Subsequently, at the time $t_{10}$, the on-off valve 52 is set to be in the open state. For this reason, the nitrogen gas is supplied to the sample tube 82 from the reference volume portion 30, so that the gas pressure PR increases and the gas pressure P1 reduces at the same time, and thus the relation of P1=PR is satisfied at the gas pressure which is determined by the Boyle-Charles' law. Consequently, the nitrogen gas as the adsorption gas is filled into the sample tube 82. At a time $t_{11}$, the on-off valve 52 is set to be in the closed state, and therefore the sample tube 82 is in an airtightly sealed state in a state where the adsorption gas is filled.

Subsequently, at the time $t_{11}$, the on-off valve 40 is set to be in the open state, and then the on-off valves 46 and 48 are set to be in the open state. The on-off valves 50, 52, and 54 remain in the closed state. For this reason, the nitrogen gas is gradually filled into the reference volume portion 30 from the adsorption gas supply source 20 and reaches a given gas pressure. At a time $t_{12}$ when the nitrogen gas reaches the given gas pressure, the on-off valves 46 and 48 are set to be in the closed state and then the on-off valve 40 is set to be in the closed state. Subsequently, at the time $t_{12}$, the on-off valve 54 is set to be in the open state. For this reason, the nitrogen gas is supplied to the saturated vapor pressure pipe 84 from the reference volume portion 30, so that the gas pressure P0 increases and the gas pressure P1 reduces at the same time, and thus the relation of P1=P0 is satisfied at the gas pressure which is determined by the Boyle-Charles' law. Consequently, the nitrogen gas serving as the adsorption gas is also filled into the saturated vapor pressure pipe 84. At the time $t_{13}$, the on-off valve 54 is set to be in the closed state, and therefore the saturated vapor pressure pipe 84 is in an airtightly sealed state in a state where the adsorption gas is filled.

At the time $t_{13}$, when the sample tube 82 and the saturated vapor pressure pipe 84 are filled with the adsorption gas and are set to be in the airtightly sealed state in the state where the adsorption gas is filled, the refrigerant 12 starts to be injected into the inner space of the refrigerant container 14 which is in the lowered state. Alternatively, the refrigerant 12 may be filled into the refrigerant container 14 in advance. Then, the refrigerant container 14 filled with the refrigerant 12 starts to rise toward the sample tubes 80 and 82 and the saturated vapor pressure pipe 84 from the lowered state. Thus, the temperatures $T_{80}$ and $T_{82}$ of the sample tubes 80 and 82 and the temperature $T_{84}$ of the saturated vapor pressure pipe start to lower from the time $t_{13}$ and thus move toward the constant temperature $T_L$ (77K) from room temperature (RT).

The rising of the refrigerant container 14 stops when the liquid level 13 of the refrigerant 12 is immersed up to about ¾ of the length of each of the sample tubes 80 and 82 and up to about ¾ of the length of the saturated vapor pressure pipe 84. A time $t_{14}$ is a stable time at which the temperatures of the sample tubes 80 and 82 and the saturated vapor pressure pipe 84 become the constant temperature $T_L$ (77 K). From the time $t_{13}$ to the time $t_{14}$, the temperatures of the sample tube 82 and the saturated vapor pressure pipe 84 are lowered, and the gas pressures PR and P0 reduce slightly.

From the time $t_{14}$, the nitrogen gas serving as the adsorption gas is again further filled into the saturated vapor pressure pipe 84. This is to fill the nitrogen gas into the saturated vapor pressure pipe 84 up to a condensing gas pressure of about 1 atm of the nitrogen gas. That is, at the time $t_{14}$, the on-off valve 40 is set to be in the open state and then the on-off valves 46 and 48 are set to be in the open state. The on-off valves 50, 52, and 54 remain in the closed state. For this reason, the nitrogen gas is gradually filled into the reference volume portion 30 from the adsorption gas supply source 20 and reaches a given gas pressure. At a time $t_{15}$ when the nitrogen gas reaches the given gas pressure, the on-off valves 46 and 48 are set to be in the closed state and then the on-off valve 40 is set to be in the closed state. Subsequently, at the time $t_{15}$, the on-off valve 54 is set to be in the open state. For this reason, the nitrogen gas is further supplied to the saturated vapor pressure pipe 84 from the reference volume portion 30, so that the gas pressure P0 further increases and the gas pressure P1 reduces at the same time, and thus the relation of P1=P0 is satisfied at the gas pressure which is determined by the Boyle-Charles' law.

After the time $t_{15}$, when the value of P1=P0 does not reach the condensing gas pressure of the nitrogen gas, while the on-off valve 54 is set to be in the open state, once again at a time $t_{16}$, the on-off valve 40 is set to be in the open state and then the on-off valves 46 and 48 are set to be in the open state. For this reason, the value of P1=P0 gradually increases and reaches the condensing gas pressure of the nitrogen gas. At a time $t_{17}$ when the value of P1=P0 reaches the condensing gas pressure of the nitrogen gas, the on-off valve 54 is set to be in the closed state, the on-off valves 46 and 48 are set to be in the closed state, and finally, the on-off valve 40 is set to be in the closed state. Thus, the nitrogen gas is filled into the saturated vapor pressure pipe 84 up to the condensing gas pressure of about 1 atm of the nitrogen gas, and the saturated vapor pressure pipe 84 is set to be in an airtightly sealed state in the state where the nitrogen gas is filled.

At a time $t_{18}$ slightly elapsed from the time $t_{17}$, the reference volume portion 30 starts to be exhausted. That is, the on-off valves 50, 52, 54 remain in the closed state, the turbo molecular pump 66 is turned on, and then the on-off valves 44 and 37 are set to be in the open state in this order. A time $t_{19}$ is a time at which the gas pressure P1 becomes a pressure $P1_0$. At this time, the on-off valve 50 is set to be in the open state and the sample tuba 80 is also exhausted. A time $t_{20}$ is a time at which the sample tube 80 also becomes a pressure $P2_0$. At this time, the on-off valve 50 is set to be in the closed state and the sample tube 80 is set to be in an airtightly sealed state in an approximately vacuum state.

In this state, monitoring is performed in order to determine whether these pressure values exceed the predetermined variation range ΔP. A time $t_{30}$ is a time after a predetermined monitoring period has elapsed from the time $t_{20}$. In the monitoring period so far, when these pressure values P1 and P2 are within the variation range of ΔP with respect to the value of $P1_0=P2_0$ (±ΔP/2), the initialization process is completed. Accordingly, the period of the initialization process is a period from the time $t_3$ to the time $t_{30}$. Since the period from the time $t_0$ to the time $t_1$ is also a startup period of the adsorption characteristic measuring apparatus 10, the period from the time $t_0$ to the time $t_{30}$ may also be the period of the initialization process in a broad sense.

Subsequent to the time $t_{30}$, the measured equilibrium pressure value acquiring process is performed. In the case of the very low pressure measurement mode, the dead volume calculating process is performed after only the measured equilibrium pressure value acquiring process is executed. In the cases of the very low pressure and high accuracy measurement mode and the very low pressure and high speed measurement mode, however, the unit-time leak pressure value acquiring process is performed during the measured equilibrium pressure value acquiring process. Moreover, in the case of the very low pressure and high accuracy measurement mode, the correction of the real leak pressure value and the true equilibrium pressure value calculating process are performed concurrently with the measured equilibrium pressure value acquiring process. Therefore, with respect to the very low pressure and high accuracy measurement mode, the measured equilibrium pressure value acquiring process, the unit-time leak pressure value acquiring process, and the true equilibrium pressure value calculating process will mainly be described below.

FIG. 4 is a flowchart illustrating steps of the measured equilibrium pressure value acquiring process. In FIG. 4, the steps not including the unit-time leak pressure value acquiring process and the true equilibrium pressure value calculating process will be described. The adsorption isotherm is configured by several measurement points (relative equilibrium pressure values; adsorption amount expressed in terms of a standard state), and the several measurement points are plotted in an adsorption isotherm in which a horizontal axis indicates the relative equilibrium pressure value and a vertical axis indicates the adsorption amount expressed in terms of the standard state. Accordingly, the measured equilibrium pressure value acquiring process is a process of acquiring a plurality of measured equilibrium pressure values.

Now, when the several measurement points are distinguished from a measurement point "n=1" to a measurement point "n=$n_{END}$," a measurement point counter is set to the first measurement point "n=1" in a first step in FIG. 4 (S40). Then, the reference volume portion 30 is exhausted (S42). Next, the adsorption gas is introduced into the reference volume portion 30 (S44). Subsequently, the adsorption gas is supplied to sample tube 80 from the reference volume portion 30 (S46). Then, the sample tube 80 is set to be in an airtightly sealed state to acquire the pressure value at which the internal pressure value P2 of the sample tube 80 assumes an equilibrium state caused by the decrease due to the adsorption (S48). This pressure value is a measured equilibrium pressure value at the measurement point "n=1." Then, it is determined whether a count value of a measurement point counter is n=$n_{END}$ (S50). In the case of the first measurement point, since the measurement point is n=1, the determination in step S50 is negative. When the determination in step S50 is negative, the count value of the measurement counter is incremented by "1" (S52), the process returns to seep S42, the process of seep S42 is executed, and the pressure value obtained in step S48 becomes a measured equilibrium pressure value of a measurement point "n=2." By the repetition of this process, when a measured equilibrium pressure value at the measurement point "n=$n_{END}$" is acquired, the determination in step S50 is affirmative, and thus the measured equilibrium pressure value acquiring process is completed and processing proceeds to the next process.

The measured equilibrium pressure value acquiring process proceeds to a high-pressure value side from a very low-pressure value side through a low-pressure value side. However, when the process may proceed in a reverse direction, in some cases the measured equilibrium pressure values are different from each other. That is, a hysteresis phenomenon often occurs in the processing of the measured equilibrium pressure value. Accordingly, when the adsorption equilibrium pressure value acquiring process is completed from the very low pressure value to the high pressure value through the low pressure value, a desorption equilibrium pressure value acquiring process is performed from the high pressure value to the low pressure value. A desorption isotherm is obtained from a plurality of desorption equilibrium pressure values. Using the adsorption isotherm and the desorption isotherm, adsorption/desorption characteristics of the sample 86 can be better evaluated.

FIGS. 5A and 5B are time charts illustrating the unit-time leak pressure value acquiring process and the true equilibrium pressure value calculating process in combination with the measured equilibrium pressure value acquiring process described with reference to FIG. 4, respectively. As in FIGS. 3B and 3C, in the time charts of FIGS. 5A and 5B, a horizontal axis represents a time "t." In FIG. 5A, a vertical axis represents a pressure value P. In FIG. 5B, a vertical axis represents on/off states of the rotary pump 68 and the turbo molecular pump 66 constituting the exhaust pump 26 and an open/close state of the nine on-off valves 37 and 40 to 54. Through the entire period of the measured equilibrium pressure value acquiring process, the on-off valves 42, 52, and 54 are in the closed state, and the rotary pump 68 is in the on-state. In FIGS. 5A and 5B, the measurement points "n=1 and n=2" are illustrated. Since the process is merely repeated as illustrated in FIG. 4, measurement points "n=3 or later" will not be presented in the drawings. A portion "(c)" in FIG. 5A represents a first partial enlarged view on the time axis in FIG. 5A and illustrates a view for describing a first unit-time leak pressure value acquiring process.

In FIGS. 5A and 5B, a time "t=$t_{100}$" is a starting time of the measured equilibrium pressure value acquiring process at the measurement point "n=1" and is a time $t_{30}$ at which the initialization process is completed. That is, when the initialization process is completed, the measured equilibrium pressure value acquiring process at the measurement point "n=1" starts directly. When the measured equilibrium pressure value acquiring process at the measurement point "n=1" needs to start after a given amount of time has elapsed from the time $t_{10}$, the user maintains the state at the time $t_{30}$ described in FIGS. 3A to 3C until the starting time of the measured equilibrium pressure value acquiring process. That is, at the time $t_{100}$, the gas pressure P1 of the reference volume portion 30 and the gas pressure P2 of the sample tube 80 are set to be in the state of $P1_0$=$P2_0$ at the same time. The state corresponds to the processing state of step S42 in FIG. 4.

At time $t_{100}$, the on-off valve 40 is set to be in the open state, and subsequently, the on-off valves 46 and 48 are set to be in the open state. This processing step is to introduce the adsorption gas into the reference volume portion 30 and corresponds to processing state of step S44 in FIG. 4. Thus, the pressure value P1 of the reference volume portion 30 gradually increases with the lapse of time.

A time $t_{101}$ is a time when the pressure value P1 of the reference volume portion 30 reaches a predetermined pressure value $P1_I$(n=1). The pressure value $P1_I$(n=1) is a pressure value of the adsorption gas introduced into the reference volume portion 30 for the measurement point "n=1." The adsorption gas having this pressure value and a volume of a reference volume $V_S$ is an initial adsorption gas supplied to the sample tube 80. Subscript "I" of $P1_I$ indicates an initial state (Initial).

The pressure value $P1_I$(n=1) is set based on the measurement point of the lowest relative pressure value set to relative pressure values in the adsorption isotherm. In FIGS. 5A and 5B, a target very-low-pressure value of the measurement point "n=1" is indicated by $P2_T$(n=1). Subscript "T" of $P2_T$ indicates a target. Based on the setting of $P2_T$(n=1), the pressure value $P1_I$ (n=1) is set by the calculation based on an empirical value or the like.

At a time $t_{101}$, the on-off valve 50 is set to be in the open state, and the adsorption gas in the reference volume portion 30 of the pressure value $P1_I$(n=1) is supplied to the sample tube 80 from the reference volume portion 30. This processing step corresponds to processing step S46 in FIG. 4. Thus, as the internal pressure value P2 of the sample tube 80 increases, the pressure value P1 of the reference volume portion 30 reduces. A time $t_{102}$ is a time when the increasing pressure P2 and the falling pressure P1 assume the same pressure value, and after this time, both of the pressures P2 and P1 reduce, while the relation P2=P1 is maintained.

A time $t_{103}$ is a time after a predetermined time has elapsed from the time $t_{101}$, and at this time, the on-off valve 50 is set to be in the closed state. The predetermined time ($=(t_{103}-t_{101})$) may be set to be, for example, 10 s. The predetermined time may be a time other than this time. For this reason, the sample tube 80 is airtightly sealed in a state where the adsorption gas is supplied. After the time $t_{103}$, the pressure value P1 is maintained as is and the pressure value P2 continues to reduce as the adsorption gas is adsorbed onto the sample 86.

In the example illustrated in FIGS. 5A and 5B, the pressure value P2 continues to reduce and then conversely increases. The reason for this is considered to be that the non-adsorption gas leaks into the sample tube 80 from the outside. When a change speed of the pressure value P2 falls between predetermined stable period times tα and falls within a given change speed range, a time when the stable period time tα has elapsed can be assumed to be a point where the pressure value P2 assumes an equilibrium state. The given change speed range is ±0.3% of the change speed. The stable period time tα is 300 s. The change speed range and the stable period time tα may be set to other values. In the example illustrated in FIGS. 5A and 5B, a time $t_{115}$ is a temporary equilibrium point, because the change speed is in the range within ±0.3% from $\alpha_{L1}$ in the period of the previous time 300 s.

Between the time $t_{115}$ serving as the temporary equilibrium point and a predetermined time, the pressure P2 is acquired, and the average of P2 at the period is a measured equilibrium pressure value $P2_A(n=1)$. In the example illustrated in FIGS. 5A and 5B, P2 at a time $t_{120}$ after a predetermined time has elapsed from the time $t_{115}$ of the temporary equilibrium point is the measured equilibrium pressure value $P2_A(n=1)$. The measured equilibrium pressure value $P2_A(n=1)$ is indicated by a circle surrounding a black circle in FIG. 5A. Subscript "A" of $P2_A$ indicates an actual measurement (Actual). This processing step corresponds to the processing step S48 in FIG. 4.

The predetermined time ($=t_{120}-t_{115}$) may be, for example, 10 s or may be other times. Accordingly, the time $t_{120}$ is a completion time of the measured equilibrium pressure value acquiring process at the measurement point "n=1," and a period from the time $t_{100}$ to the time $t_{120}$ is a period of the measured equilibrium pressure value acquiring process at the measurement point "n=1." The measured equilibrium pressure value acquiring process is executed by a function of the measured equilibrium pressure value acquiring portion 74 in the measurement controller 70.

The time axis is returned to an original state, and the sample tube 80 is airtightly sealed at the time $t_{100}$. Therefore, when the non-adsorption gas does not leak to the sample tube 80 from the outside, the pressure value P2 can be maintained at the value of $P1_0=P2_0$ until the on-off valve 50 is set to be in the open state at the time $t_{101}$. In fact, from the time $t_{100}$ the time $t_{101}$, P2 slightly increases. The enlarged view thereof is illustrated in (c) in FIG. 5A. When this slight pressure increase value is set to $P_{LA0}(n=0)$ and the period ($t_{102}-t_{101}$) is tα$_0$, αL$_0$ ($=\{P_{LA0}(n=0)/t\alpha_0\}$) is a first unit-time leak pressure value of the measured equilibrium pressure value acquiring process. In this way, at the first period time of the measured equilibrium pressure value acquiring process, it is possible to acquire the first unit-time leak pressure value αL$_0$. A processing step of acquiring the first unit-time leak pressure value αL$_0$ is executed by a function of the unit-time leak pressure value acquiring portion 73 in the measurement controller 70.

The leak through which the non-adsorption gas enters into the sample tube 80 from the outside is generated over the entire period until the adsorption gas supplied to the sample tube 80 after the adsorption gas is supplied to the sample tube 80 and then the sample tube is in an airtightly sealed state. In FIG. 5A, at the first measurement point "n=1," the leak through which the non-adsorption gas enters into the sample tube 80 from the outside is generated over the entire period from the time $t_{101}$ to the time $t_{120}$. Therefore, the period time from the time $t_{101}$ to the time $t_{120}$ is called a leak time (n=1). A value obtained in such a manner that the unit-time leak pressure value is multiplied by a leak time (n=1) is a real leak pressure value (n=1).

At the measurement point (n=1), since the change speed $\alpha_{L1}$ of the pressure value P2 during 300 s of the stable time tα up to the temporary equilibrium point $t_{115}$ is a change speed of the pressure value P2 when the pressure value P2 continues to reduce due to the adsorption and then conversely increases, it corresponds to the unit-time leak pressure value at that time. Therefore, as a unit-time leak pressure value at the measurement point (n=1), $\alpha_{L1}$ can be used. In this way, during the measured equilibrium pressure value acquiring process, it is possible to acquire the unit-time leak pressure value at each measurement point.

In the enlarged view of (c) in FIG. 5A, the leak pressure value $P_{LA0}(n=1)$ at the time $t_{101}$, which is an initial setting time of the leak period of the measurement point (n=1), is a pressure value slightly lower than the first pressure increase value $P_{LA0}(n=0)$ at the time $t_{101}$, which is the first time point of the measured equilibrium pressure value acquiring process. This is because of the following reasons. That is, the real leak pressure value at the time $t_{101}$, which is the first time point of the measured equilibrium pressure value acquiring process, is $P_{LA0}(n=0)$, but the non-adsorption gas corresponding to the real leak pressure value is present inside the sample tube 80. Meanwhile, it is supposedly considered that the non-adsorption gas is not mixed into the reference volume portion 30. At the time $t_{101}$, since the on-off valve 50 is set to be in the open state, the non-adsorption gas present inside the sample tube 80 flows into the inside of the reference volume portion 30. For this reason, the amount of non-adsorption gas present inside the sample tube 80 is reduced, and correspondingly, the real leak pressure value of the sample tube 80 also reduces from $P_{LA0}(n=0)$ at the time $t_{101}$. In FIG. 5A, the real leak pressure value of the sample tube 80 at the time $t_{101}$ is indicated as $P_{LA0}(n=1)$.

The $P_{LA0}(n=1)$ can be calculated by the following Equation (1) when a dead volume calculated by the dead volume calculating process to be described below is defined as $V_D$ and the mixing between the non-adsorption gas and the adsorption gas flowing into the reference volume portion 30 from the sample tube 80 is complete mixing:

$$P_{LA0}(n=1)=[P_{LA0}(n=0)\times\{V_D/(V_S+V_D)\}] \qquad (1)$$

Therefore, a real leak pressure value $P_{LA}(n=1)$ at the time $t_{120}$ of the measurement point (n=1) is calculated by $[P_{LA0}(n=1)+\alpha_{L1}\times(\text{time } t_{120}-\text{time } t_{101})]$. The expression (time $t_{120}$−time $t_{101}$) represents a leak time at the measurement point (n=1), and the $\alpha_{L1}$ represents a unit-time leak pressure value at the measurement point (n=1). The real leak pressure value $P_{LA}(n=1)$ is indicated by a circle surrounding a black circle in FIG. 5A.

At time $t_{120}$, a value obtained by subtracting the real leak pressure value $P_{LA}(n=1)$ from a measured equilibrium pressure value $P2_A(n=1)$ is a true equilibrium pressure value $P2_C(n=1)$ after the correction of the real leak pressure value. Subscript "C" of $P2_C$ indicates a corrected value (Corrected), and indicates a true value that is more correct than the actual measured value. Thus, the calculation process of the true equilibrium pressure value $P2_C(n=1)$ is performed.

The calculation process of the true equilibrium pressure value is executed by a function of the true equilibrium pressure value calculating portion 75 in the measurement controller 70.

In the measured equilibrium pressure value acquiring process at the measurement point (n=2), the processes from the time $t_{100}$ to the time $t_{120}$ the measurement point (n=1) are repeated. Supply timing of the adsorption gas into the sample tube 80 at the measurement point (n=2) is a completion time $t_{120}$ of the measured equilibrium pressure value acquiring process at the measurement point (n=1). Before this timing, the reference volume portion 30 is sufficiently exhausted, and then the adsorption gas is introduced into the reference volume portion 30. Thus, it is necessary that the pressure value P1 of the reference volume portion 30 increases to become a predetermined $P1_f(n=2)$ during the time $t_{120}$.

For this reason, at a time $t_{114}$ at the measurement point (n=1), the turbo molecular pump 66 is turned on, and subsequently, the on-off valve 44 is set to be in the open state and then the on-off valve 37 is set to be in the open state. Accordingly, the reference volume portion 30 is exhausted from the time $t_{114}$, and thus the pressure P1 reduces and becomes the value of $P1_0=P2_0$. Then, at a time $t_{115}$ which is a temporary equilibrium point, the on-off valve 37 is set to be in the closed state, and subsequently, the on-off valve 44 is set to be in the closed state and then the turbo molecular pump 66 is turned off. Thereafter, the on-off valves 46 and 48 are set to be in the open state, and the on-off valve 40 is set to be in the open state. The time $t_{120}$ is a time at which the measured equilibrium pressure value acquiring process is started at the measurement point (n=2). If this time is a time $t_{200}$, it is a time corresponding to the time $t_{100}$ at the measurement point (n=1).

Hereinafter, times at the measurement point (n=2) each corresponding to the times $t_{101}$, $t_{102}$, $t_{103}$, $t_{114}$, $t_{115}$, and $t_{120}$ at the measurement point (n=1) are illustrated as times $t_{201}$, $t_{202}$, $t_{203}$, $t_{214}$, $t_{215}$, and $t_{220}$ in FIGS. 5A and 5B. The time $t_{215}$ is a temporary equilibrium point at the measurement point (n=2), and a unit-time leak pressure value at the measurement point (n=2) is indicated as $\alpha_{L2}$. A pressure P1 at the time $t_{220}$ is a measured equilibrium pressure value $P2_A(n=2)$. The measured equilibrium pressure value $P2_A$ (n=2) is indicated by a circle surrounding a black circle in FIG. 5A. The open/close states of the on-off valves at each of the times are the same as those described with reference to the corresponding times at the measurement point (n=1), and the detailed description thereof will not be provided.

Herein, the time $t_{201}$ is a time when the pressure P2 rising from the time $t_{200}$ reaches a given pressure value $P1_f(n=2)$, the given pressure value $P1_f(n=2)$ is set based on the measurement point to be a second very low relative pressure value set to one of relative pressure values in the adsorption isotherm. In FIG. 5A, a target very-low-pressure value at the measurement point (n=2) is indicated by $P2_T(n=2)$. Based on the setting of $P2_T(n=2)$, the pressure value $P1_f(n=2)$ is set by the calculation based on an empirical value or the like. Since the pressure value $P2_T(n=2)$ is set to be higher than $P2_T(n=1)$, the pressure value $P1_f(n=2)$ is also set to be higher than the pressure value $P1_f(n=1)$.

Thus, the measured equilibrium pressure value is acquired at the measurement point (n=2). A measured equilibrium pressure value is also acquired in the same manner at a measurement point subsequent to a measurement point (n=3).

The true equilibrium pressure value can also be calculated at the measurement point (n=2) in such a manner that the real leak pressure value is subtracted from the measured equilibrium pressure value, but the following correction must be performed on the real leak pressure value. That is, the real leak pressure value at the time $t_{120}$ of the measurement point (n=1) is $P_{LA}(n=1)$, but the non-adsorption gas corresponding to the real leak pressure value is present inside the sample tube 80. Meanwhile, it is supposedly considered that the non-adsorption gas is not mixed into the reference volume portion 30. Since the on-off valve 50 is set to be in the open state at the time $t_{201}$ of the measurement point (n=2), the non-adsorption gas present inside the sample tube 80 flows into the inside of the reference volume portion 30. For this reason, the amount of non-adsorption gas present inside the sample tube 80 is reduced, and correspondingly, the real leak pressure value of the sample tube 80 also reduces from $P_{LA}(n=1)$ at the time $t_{201}$. In FIG. 5A, the real leak pressure value of the sample tube 80 at the time $t_{201}$ of the measurement point (n=2) is indicated as $P_{LA0}(n=2)$. Subscript "LA0" of $P_{LA0}$ indicates a real leak at a starting point of the measurement point (n=2).

The pressure $P_{LA0}(n=2)$ can be calculated by the following Equation (2) as in Equation (1) described at the time $t_{101}$ of the measurement point (n=1):

$$P_{LA0}(n=2)=[P_{LA}(n=1)\times\{V_D/(V_S+V_D)\}] \qquad (2)$$

In FIG. 5A, a dashed-dotted line having a gradient of a unit-time leak pressure value $\alpha_{L2}$ at the measurement point (n=2) is indicated to extend from $P_{LA0}(n=2)$ at the time $t_{202}$. The pressure value indicated by the dashed-dotted line is a real leak pressure value at each of the times of the measurement point (n=2). The pressure value indicated by the dashed-dotted line at the time $t_{220}$ is the real leak pressure value $P_{LA}(n=2)$ at the time $t_{220}$. The real leak pressure value $P_{LA}(n=2)$ is indicated by a circle surrounding a black circle in FIG. 5A. In this way, the real leak pressure value at the measurement point (n=2) is acquired.

At the time $t_{220}$, a value obtained by subtracting the real leak pressure value $P_{LA}(n=2)$ from the measured equilibrium pressure value $P2_A(n=2)$ is a true equilibrium pressure value $P2_C(n=2)$ after the correction of the real leak pressure value. In this way, the calculation process of the true equilibrium pressure value at the measurement point (n=2) is performed. The true equilibrium pressure value at the measurement point subsequent to the measurement point (n=3) is also acquired in the same manner while being accompanied by the correction of the real leak pressure value.

In FIG. 5A, when the pressure value P1 of the reference volume portion 30 reaches $P1_f(n=1)$ at the measurement point (n=1), the introduction of the adsorption gas into the reference volume portion 30 is stopped. Similarly, when the pressure value P1 of the reference volume portion 30 reaches $P1_f(n=2)$ even at the measurement point (n=2), the introduction of the adsorption gas is stopped. The pressures $P1_f(n=1)$ and $P1_f(n=2)$ are set based on the target-very-low-pressure values $P2_T(n=1)$ and $P2_T(n=2)$ corresponding to the very low relative pressure values to be obtained in the adsorption isotherm. In FIG. 5A, the setting of the pressures $P1_f(n=1)$ and $P1_f(n=2)$ is appropriate, and thus the measured equilibrium pressure values substantially coincide with the target very-low-pressure values at both of the measurement point (n=1) and the measurement point (n=2). When the adsorption amount is greater than the adsorption amount which has been assumed in the setting of the pressures $P1_f(n=1)$ and $P1_f(n=2)$, the measured equilibrium pressure value deviates from the target very-low-pressure value.

FIGS. 6A and 6B are time charts illustrating methods of coping with the case where the measured equilibrium pressure value may deviate from the target very-low-pressure value when the adsorption amount is greater than the adsorption amount which has been assumed in a first setting of $P2_{I1}(n=2)$ based on the target very-low-pressure value $P2_T(n=2)$, as an example of the measurement point (n=2). In FIGS. 6A and 6B, a horizontal axis and a vertical axis are the same as those in FIGS. 5A and 5B. Here, an allowable range $\Delta P_T$ of the deviation with respect to the target very-low-pressure value $P2_T(n=2)$ is predetermined. When the pressure value P2 exceeds the range, the measured equilibrium pressure value acquiring process is again performed once more at that time and the pressure $P2_{I1}(n=2)$ is newly reset to the pressure $P2_{I2}(n=2)$.

In FIGS. 6A and 6B, the pressure value P1 reaches $P2_{I1}(n=2)$, which is initially set, at the time $t_{201}$, and the on-off valve 50 is set to be in the open state at that time, so that the pressure value P2 increases and the pressure value P1 reduces, and thus the relation of P1=P2 is satisfied at a time $t_{202}$. After that, the pressures P1 and P2 are similarly reduced, and the on-off valve 50 is set to be in the closed state at a time $t_{203}$. So far, the description is the same as that for FIGS. 5A and 5B.

After the time $t_{203}$, the pressure P2 continues to reduce, and when the pressure P2 exceeds a threshold pressure lower than the pressure $P2_T(n=2)$ by $\Delta P_T$ at a time $t_{204}$, the turbo molecular pump 66 is turned on, and subsequently, the on-off valve 44 is set to be in the open state and then the on-off valve 37 is set to be in the open state. Thus, the reference volume portion 30 starts to be exhausted, and the pressure P1 assumes the value of $P1_0=P2_0$ at a time $t_{205}$. Then, at the time $t_{205}$, after the on-off valve 37 is set to be in the closed state, the on-off valve 44 is set to be in the closed state, and subsequently, the turbo molecular pump 66 is turned off. Thereafter, the on-off valve 40 is set to be in the open state, and subsequently, the on-off valves 46 and 48 are set to be in the open state. Thus, since the pressure value P1 of the reference volume portion 30 increases, the on-off valve 50 is set to be in the open state at a time $t_{206}$ when the pressure value P1 reaches a new pressure $P2_{I2}(n=2)$, so that the pressure value P2 increases and the pressure value P1 reduces, and thus the relation of P1=P2 is satisfied at a time $t_{207}$. After that, the pressures P1 and P2 are similarly reduced, and the on-off valve 50 is set to be in the closed state at a time $t_{208}$. Herein, the new pressure value $P2_{I2}(n=2)$ is set to be higher than the initial pressure value $P2_{I1}(n=2)$. That is, under the setting of the new pressure value $P2_{I2}(n=2)$, the process from the time $t_{100}$ to the time $t_{203}$ is again performed.

Here, after the time $t_{208}$, when the pressure P2 continues to reduce and thus also exceeds the threshold pressure lower than the pressure $P2_T(n=2)$ by $\Delta P_T$ at a time $t_{209}$, larger-than-expected adsorption amount is still present even in the setting of the new pressure $P2_{I2}(n=2)$. Therefore, under setting of a further new pressure $P2_{I3}(n=2)$, the above process is again performed. That is, the reference volume portion 30 re-starts to be exhausted at the time $t_{209}$, and the adsorption gas starts to be introduced into the reference volume portion 30 at a time $t_{210}$ and reaches the newly set pressure $P2_{I1}(n=2)$ at a time $t_{211}$. Therefore, the on-off valve 50 is set to be in the open state, so that the pressure value P2 increases and the pressure value P1 reduces, and thus the relation of P1=P2 is satisfied at a time $t_{212}$. After that, the pressures P1 and P2 are similarly reduced, and the on-off valve 50 is set to be in the closed state at a time $t_{213}$. After the time $t_{213}$, the pressure P2 continues to reduce, but does not exceed the threshold pressure lower than the pressure $P2_T(n=2)$ by $\Delta P_T$ at this time. Then, a time $t_{215}$ becomes a temporary equilibrium point, and the measured equilibrium pressure value $P2_A(n=2)$ is acquired at a time $t_{220}$.

Thus, when the measured equilibrium pressure value $P2_A(n=2)$ exceeds the threshold pressure lower than the target very-low-pressure value $P2_T(n=2)$ by $\Delta P_T$, after $P2_I(n=2)$ is again newly set, the process returns to the exhaust process of the reference volume portion 30 to again perform the measured equilibrium pressure value acquiring process. For this reason, it is possible to obtain the measured equilibrium pressure value closer to the target very-low-pressure value $P2_T(n=2)$.

It is necessary to correct the real leak pressure value by mixing the non-adsorption gas contained in the sample tube 80 into the reference volume portion 30 for each of the repetitions. In an example illustrated in FIGS. 6A and 6B, since the repetition is performed two times as compared with the case described with reference to FIGS. 5A and 5B, the correction times of the real leak pressure value due to the mixing are increased two times compared with the case described with reference to FIGS. 5A and 5B. In this way, it is possible co correct the real leak pressure value and to calculate the true equilibrium pressure value $P2_C(n=2)$.

In the example illustrated in FIGS. 6A and 6B, all of the unit-time leak pressure values after three times of correction of the real leak pressure value are assumed to use $\alpha_{L2}$. Among them, the unit-time leak pressure values at two periods when exceeding the threshold pressure lower than the target very-low-pressure value $P2_T(n=2)$ by $\Delta P_T$ may be assumed to use $\alpha_{L1}$. Alternatively, only the unit-time leak pressure value at the first one period when exceeding the threshold pressure lower than the target very-low-pressure value $P2_T(n=2)$ by $\Delta P_T$ may be assumed to use $\alpha_{L1}$.

Next, the measured equilibrium pressure value estimating process in FIG. 2 will be described with reference to FIG. 7. FIG. 7 is a diagram obtained by extracting temporal change characteristic lines of the pressure value P2 at the measurement point (n=2) in FIG. 6A, wherein a horizontal axis represents a time and a vertical axis represents a pressure value. In FIGS. 5A, 5B, 6A, and 6B, although the scale of the horizontal axis appropriately shortens or extends, the longest time in the measured equilibrium pressure value acquiring process is a time of reaching an equilibrium point in such a manner that the on-off valve 50 is set to be in the closed state after the adsorption gas is supplied to the sample tube 80 and thereafter, the adsorption gas is adsorbed onto the sample 86, and the P2 reduces and then starts to increase due to the leak, so that the increase speed becomes gradually stable. In an example illustrated in FIG. 7, a point E1 is the time $t_{203}$ at which the on-off valve 50 is set to be in the closed state, and the time from the time $t_{203}$ to a time $t_{220}$ is long and occupies most of the measurement time of the measurement point (n=2).

The measured equilibrium pressure value estimating process is a process of estimating a temporal change characteristic line of the pressure value P2 from data (pressure value, time) of a number of measurement points E1, E2, 23, E4, E5, E6, and E7 without waiting from the time $t_{203}$ to the time $t_{215}$ which is the temporary equilibrium point and of calculating the measured equilibrium pressure value $P2_A(n=2)$ in a short time. This processing step is executed by a function of the measured equilibrium pressure value estimating portion 78 in the measurement controller 70.

The temporal change characteristic line of the pressure P2 includes a term of the pressure value change due to the adsorption of the adsorption gas onto the sample 86, a term of the real leak pressure value change, and an offset term. The pressure value change due to the adsorption of the adsorption gas onto the sample 86 can be expressed approximately by an exponential attenuation function using an adsorption model. For example, it is possible to approximate a temporal change characteristic line of the pressure P2 from the following Equation in consideration of two cases, fast attenuation and slow attenuation. The term of the real leak pressure value change can be expressed by a linear temporal change function when the user knows the unit-time leak pressure value.

The temporal change characteristic line of the pressure P2 can be approximated by the following Equation (3). Herein, a symbol "*" indicates multiplication processing, and a symbol "/" indicates division processing. A term t(E1) is a time, at which the on-off valve 50 is set to be in the closed state, and is the time $t_{203}$ of the measurement point E1 in FIG. 7.

$$P2(t)=c1*\exp[-\{t-t(E1)\}/c2]+c3*\exp[-\{t-t(E2)\}/c4]+c5*\{t-t(E1)\}+d \quad (3)$$

In the example illustrated in FIG. 7, using this Equation, the measured values (P2, t) of the measurement points E1, E2, E3, E4, E5, E6, and E7 are applied to solve simultaneous equations, and coefficients c1, c2, c3, c4, c5, and d are determined. Using the measured values greater in number than the unknown quantities, for example, using a least-squares method, the accuracy of the temporal change characteristic line of the pressure P2 can be improved. When the approximate formula of the temporal change characteristic line of the pressure P2 is obtained, it is possible to calculate an estimation value of the measured equilibrium pressure value $P2_A(n=2)$ by substitution of $t=t_{220}$.

The temporal change characteristic line of the pressure P2 may be estimated for each of the measurement points, but it is possible to estimate the subsequent measured equilibrium pressure value using the temporal change characteristic line of the pressure P2 obtained by the first measurement point (n=1) when the dependency of the pressure value in the adsorption model is low, and to significantly shorten the total measurement time of the adsorption characteristic line.

Since the processes up to step S26 in FIG. 2 are described in the above description, a dead volume calculating process (S28) in FIG. 2 will be described below. The dead volume is a whole of the previous volumes directed toward the sample tube 80 from the on-off valve 50 in FIG. 1. In the calculation of the dead volume, the volume of the sample 86 is excluded. That is, the dead volume is a whole volume of the adsorption gas to be filled ahead of the on-off valve 50. In the example illustrated in FIG. 1, a dead volume $V_D$ is the total of the internal volume of the pipe line from the on-off valve 50 to the fitting portion 16, the internal volume in pressure gauge 60, the internal volume of the fitting portion 16, and the volume obtained by removing the volume of the sample 86 from the internal volume of the sample tube 80. In comparison with the reference volume portion 30, a portion in which the dead volume is calculated is called a dead volume portion.

In the example illustrated in FIG. 1, the reference volume $V_S$ of the reference volume portion 30 is the total of the volume of the pipe lines surrounded by the on-off valves 37, 46, 48, 50, 52, and 54 and the internal volume of the pressure gauge 58. Since the reference volume $V_S$ is a specific value of the adsorption characteristic measuring apparatus 10, it can be measured in advance. In the example illustrated in FIG. 1, the reference volume $V_S$ is 25 ml under the reference temperature $T_R$.

The calculation of the dead volume is performed by the following steps. First, the dead volume portion is sufficiently exhausted to acquire a pressure value P2(1) of the dead volume portion. In the example illustrated in FIGS. 3A to 3C, the pressure value P2(1) is $P2_0$. In this state, the on-off valve 50 is set to be in the closed state. Subsequently, the on-off valves 46 and 48 are set to be in the open state and thus the helium gas serving as the non-adsorption gas is introduced into the reference volume portion 30 to acquire the pressure value P1(1) of the reference volume portion 30 at that time. In this state, the on-off valves 46 and 48 are set to be in the closed state. Finally, the on-off valve 50 is set to be in the open state and thus the helium gas present in the reference volume portion 30 is supplied to the dead volume portion to acquire the relation of {pressure value P1(2) of the reference volume portion 30}={pressure value P2(2) of the dead volume portion} at that time. Then, based on P1(1), P2(1), and P1(2)=P2(2), the volume of the helium gas supplied to the dead volume portion is calculated according to the Boyle-Charles' law and the calculated value is called the dead volume $V_D$.

In order to improve the calculation accuracy of the dead volume, it is preferable to increase the pressure P2 in a stepwise fashion by dividing the increases into N times and to obtain the dead volume for each time. In this case, a N-th dead volume $V_D(N)$ is calculated by the following steps based on $P2_E(N-1)=P1_E(N-1)$ when a (N−1) time is finished, $P1_S(N)$ when the helium gas is introduced into the reference volume portion 30 at the N-th time, and $P1_E(N)=P2_E(N)$ when the N-th time is finished.

When the helium gas is introduced into the reference volume portion 30 at the N-th time, the total of the amount of the helium gas introduced into the reference volume $V_S$ of the reference volume portion 30 and the remaining amount of the helium gas contained in the dead volume $V_D$ of the dead volume portion at the (N−1)-th time is expressed by the following Equation (4) according to PV=nRT of the Boyle-Charles' law.

$$[\{P1_S(N)*V_S\}+\{P2_E(N-1)*V_D(N-1)\}] \quad (4)$$

Meanwhile, at the time of N-th equilibrium, the sum of the amount of the helium gas contained in the reference volume $V_S$ of the reference volume portion 30 and the amount of the helium gas contained in the dead volume $V_D$ of the dead volume portion is expressed by the following Equation (5).

$$[\{P1_E(N)*V_S\}+\{P2_E(N)*V_D\}] \quad (5)$$

Since both have the same amount of helium gas, the following Equation (6) is established.

$$[\{P1_S(N)*V_S\}+\{P2_E(N-1)*V_D(N-1)\}]=[\{P1_E(N)*V_S\}+\{P2_E(N)*V_D\}] \quad (6)$$

By solving this equation for the N-th dead volume $V_D(N)$, the N-th dead volume $V_D(N)$ is calculated by the following Equation (7).

$$V_D(N)=[\{P1_S(N)-P1_E(N)\}*V_S+\{P2_E(N-1)\}*V_D(N-1)]/P2_E(N) \quad (7)$$

$P1_S(N)$ increases in a stepwise fashion, the dead volume $V_D(N)$ is calculated for each step, and an average value of the plurality of dead volumes $V_D(N)$ is called a final dead volume $V_D$.

The helium gas serving as the non-adsorption gas is used for the calculation of the dead volume. However, since the helium gas has a small molecular weight, the non-adsorption gas easily remains in the sample tube 80 when exhaust is sufficiently performed. When the step of processing the measured equilibrium pressure value is performed in the state where the non-adsorption gas remains in the sample tube 80, an error easily occurs. Thus, after performing the step of processing the measured equilibrium pressure value, it is preferable to execute the dead volume calculating process.

FIGS. 8A and 8B are time chares with respect to the dead volume calculating process. A horizontal axis and a vertical axis are similar to those described in FIGS. 5A and 5B, but then time charts are different from FIGS. 5A and 5B in that a gas to be introduced into the reference volume portion 30 is the helium gas.

A time $t_{400}$ is a time when a measured equilibrium pressure value acquiring process at a final measurement point "$n=n_{END}$" is finished and the dead volume calculating process starts. At this time, the internal pressure value P2 of the sample tube 80 and the internal pressure value P1 of the reference volume portion 30 depend on the prior processing conditions, but there is a case where the pressure values are different from each other. At this time, when the on-off valve 50 is opened, there is a concern that the powder sample 86 accommodated in the sample tube 80 is scattered. Therefore, at a time $t_{401}$, the nitrogen gas having substantially the same components as the air is supplied to the sample tube 80 from the adsorption gas supply source 20, and thus a pressure increase process is performed until the pressure value P2 of the sample tube 80 is close to the pressure P1, and thereafter, the exhaust of the sample tube 80 is performed.

Since processes from the time $t_{401}$ to a time $t_{405}$ are the same as those from the time $t_1$ to the time $t_5$ described in FIGS. 3A to 3C, the detailed description thereof will not be repeated. The time $t_{405}$ is a time at which the sample tube 80 is sufficiently depressurized together with the reference volume portion 30 and the pressure values P1 and P2 become the value of $P1_0=P2_0$ at the same time. At this time, the on-off valve 50 is set to be in the closed state, the on-off valves 37 and 44 are set to be in the closed state in this order, and the turbo molecular pump 66 is turned off. In this state, monitoring is performed in order to determine whether the pressure value P2 exceeds a predetermined variation range ΔP. A time $t_{501}$ is a time after a predetermined monitoring period has elapsed from the time $t_{405}$. In the monitoring period so far, when the pressure value P2 is within the variation range of ΔP with respect to the pressure $P2_0$ (±ΔP/2), a process of introducing the helium gas into the reference volume portion 30 and a process of supplying the helium gas of the reference volume portion 30 to the dead volume portion including the sample tube 80 are performed in a stepwise fashion. In an example illustrated in FIGS. 8A and 8B, the pressure value P2 of the dead volume portion increases in a stepwise fashion by being divided into seven times. As an example, the pressure value P2 increases in a stepwise fashion as follows: PD1=10 kPa, PD2=30 kPa, PD3=50 kPa, PD4=70 kPa. PD5=90 kPa, PD6=100 kPa, and PD7=110 kPa. This is merely an example, and the number of steps and the pressure value P2 in each step may be different from this.

Since the on-off valves have the same opening/closing control in each step, when the description is given with respect to a first step (N=1), at $t_{501}$, the on-off valve 42 is set to be in the open state, and then the on-off valves 46 and 48 are set to be in the open state. For this reason, the helium gas is introduced into the reference volume portion 30, and the pressure value P1 of the reference volume portion 30 increases. A time $t_{502}$ is a time when the pressure value of the reference volume portion 30 reaches a target pressure value obtained in such a manner that a predetermined pressure value is added to the pressure value PD1. In order for the pressure value of the reference volume portion 30 to reach the target pressure value obtained in such a manner that the predetermined pressure value is added to the pressure value PD1, timing is controlled such that the on-off valve 46 and the on-off valve 48 are set to be in the open state. At the time $t_{502}$, the on-off valves 46 and 48 are set to be in the closed state, and subsequently, the on-off valve 42 is set to be in the closed state. Thereafter, the on-off valve 50 is set to be in the open state, and the helium gas present in the reference volume portion 30 is supplied to the dead volume including the sample tube 80.

In this way, the pressure value P2 of the dead volume portion including the sample tube 80 increases, and the pressure value P1 of the reference volume portion 30 reduces at the same time. Then, the relation of P1=P2 is satisfied, and the helium gas is stable at that state because of the non-adsorptive gas. A time $t_{503}$ is a time at which the relation of P1=P2 is sufficiently stable, and this time is a starting time of the processing to the next PD2.

In FIG. 8A, an enlarged view is illustrated using a fourth step (N=4) as a representative. This enlarged view illustrates (N−1)-th (third step (N=3) in FIG. 8A) $P1_E(N-1)=P2_E(N-1)$ and N-th and $P1_S(N)$ and $P1_E(N)=P2_E(N)$ in accordance with Equation (7). These values are acquired by the pressure gauges 58 and 60, Equation (6) is applied with respect to the N-th step, and the N-th dead volume $V_D(N)$ is calculated. In FIG. 8A, $[\{V_D(N=2)+V_D(N=3)+V_D(N=4)+V_D(N=5)+V_D(N=6)\}/5]$ is calculated as a final dead volume $V_D$. Even in the case of the helium gas, the gas may be adsorbed into micropores or the like of the material. Thus, in order not to contain the error, $V_D(N=1)$ is not put to the basis of the average.

In FIGS. 8A and 8B, the time $t_{510}$ is a time when a measurement of the dead volume $V_D(N=7)$ of a final seventh step (N=7) is completed. The calculation of the dead volume $V_D$ until the time $t_{510}$ has been performed in a state where the sample tube 80 is immersed in the refrigerant 12. Next, the calculation of the dead volume is performed in a state where the sample tube 80 is in a state of the temperature RT. The dead volume in the state of the temperature RT is used at the time of the correction of $V_D$ in (Clause 2. Correction of $V_S$ and $V_D$ with respect to a gas which is not an ideal gas) to be described below.

At the time $t_{510}$, the on-off valve 50 is set to be in the closed state. At a time $t_{511}$ slightly elapsed from the time $t_{510}$, the turbo molecular pump is turned on, and subsequently, the on-off valve 44 is set to be in the open state and then the on-off valves 46 and 48 are set to be in the open state. Thus, the exhaust of the reference volume portion 30 is gently performed. A time $t_{512}$ is a time when the pressure value P1 of the reference volume portion 30 reaches $P_{46}$. At this time, the on-off valves 46 and 48 are set to be in the closed state, the on-off valve 37 is alternatively set to be in the open state, and thus a quick exhaust is performed by the on-off valve 37. A time $t_{513}$ is a time at which the sample tube 80 is sufficiently depressurized together with the reference volume portion 30 and the pressure values P1 and P2 become the value of $P1_0=P2_0$ at the same time.

At the time $t_{513}$, the on-off valve 50 is set to be in the closed state. In this way, the sample tube 80 is set to be in an airtightly sealed state while remaining substantially in a vacuum state. In this state, monitoring is performed in order to determine whether the pressure values P1 and P2 exceed a predetermined variation range ΔP. A time $t_{514}$ is a time after a predetermined monitoring period has elapsed from the time $t_{513}$. In the monitoring period so far, when the pressure value P2 is within the variation range of ΔP with respect to the pressure $P2_0$ (±ΔP/2), the on-off valves 52 and 54 are set to be in the open state and the sample tube 82 and the saturated vapor pressure pipe 84 start to be exhausted.

A time $t_{515}$ is a time at which the pressure values PR and P0 of the sample tube 82 and the saturated vapor pressure pipe 84 become the value of $P1_0=P2_0$. Form this time, monitoring is performed in order to determine whether the pressure values P1, P2, PR, and P0 exceed the predetermined variation range $\Delta P$. A time $t_{515}$ is a time after a predetermined monitoring period has elapsed from the time $t_{515}$. In the monitoring period so far, when the pressure values P1, P2, PR, and P0 are within the variation range of $\Delta P$ with respect to the value of $P1_0=P2_0$ ($\pm\Delta P/2$), the refrigerant container 14 increases and a temperature $T_{80}$ of the sample tube 80 gently rises from a temperature of $T_L=77K$ at the time $t_{516}$ and thus reaches the temperature RT at a time $t_{517}$.

From a time $t_{520}$ appropriately elapsed from the time $t_{517}$, the measurement of the dead volume starts at the temperature RT. First, at a time $t_{520}$, the on-off valves 52 and 54 are set to be in the closed state. In this way, all of the sample tubes 80 and 82 and the saturated vapor pressure pipe 84 are set to be in an airtightly sealed state closer to the vacuum under the temperature RT, the on-off valves 37 and 44 are set to be in the closed state in this order, and then the turbo molecular pump 66 is turned off. From this state, monitoring is performed in order to determine whether the pressure value P2 exceeds the predetermined variation range $\Delta P$.

A time $t_{521}$ is a time after a predetermined has elapsed from the time $t_{520}$. In the monitoring period so far, when the pressure value P2 is within the variation range of $\Delta P$ with respect to the pressure $P1_0=P2_0$ ($\pm\Delta P/2$), at the time $t_{521}$, the on-off valve 40 is set to be in the open state and on-off valves 46 and 48 are set to be in the open state. In this way, the helium gas is introduced into the reference volume portion 30. A time $t_{522}$ is a time when the gas pressure P1 reaches a given introduction pressure. The given introduction pressure is about PD1=10 kPa. At the time $t_{522}$, after the on-off valves 46 and 48 are set to be in the closed state, the on-off valve 42 is set to be in the closed state, and finally, the on-off valve 50 is set to be in the open state. For this reason, the helium gas is supplied to the sample tube 80 from the reference volume portion 30, so that the gas pressure P2 increases and the gas pressure P1 reduces at the same time, and thus the relation of P1=P2 is satisfied at the time $t_{523}$. The dead volume at the temperature RT is calculated according to the Equation based on Equation (7). In this way, the dead volume calculating process is performed. The dead volume calculating process is executed by a function of the dead volume calculating portion 76 in the measurement controller 70.

When the calculation of the dead volume at the temperature RT is completed, the inside of the sample tube 80 is exhausted. That is, at a time slightly delayed from the time $t_{523}$, after the turbo molecular pump 66 is turned on, the on-off valve 44 and the on-off valves 46 and 48 are set to be in the open state, and subsequently, the on-off valve 50 is set to be in the open state. For this reason, the inside of the sample tube 80 is gently exhausted. At a time $t_{524}$ is a time when the pressure value P1 of the reference volume portion 30 reaches P46. At this time, the on-off valves 46 and 48 are set to be in the closed state, the on-off valve 37 is alternatively set to be in the open state, and the quick exhaust is performed by the on-off valve 37. A time $t_{525}$ is a time at which the sample tube 80 is sufficiently depressurized together with the reference volume portion 30 and the pressure values P1 and P2 become the value of $P1_0=P2_0$ at the same time.

In this state, the on-off valve 50 is set to be in the closed state, and the sample tube 80 is in an airtightly sealed state closer to the vacuum. From this state, monitoring is performed in order to determine whether the pressure value P2 exceeds the predetermined variation range $\Delta P$. A time $t_{530}$ is a time after a predetermined has elapsed from the time $t_{525}$. In the monitoring period so far, when the pressure value P2 is within the variation range of $\Delta P$ with respect to the pressure $P1_0=P2_0$ ($\pm\Delta P/2$), at the time $t_{530}$, the nitrogen gas starts to be filled in the sample tubes 80 and 82 and the saturated vapor pressure pipe 84. That is, at the time $t_{530}$, the on-off valves 37 and 44 are set to be in the closed state in this order and then turbo molecular pump 66 is turned off. Thereafter, the on-off valve 40 is set to be in the open state, and subsequently, the on-off valves 50, 52, and 54 are set to be in the open state. In this way, the nitrogen gas is supplied to the sample tubes 80 and 82 and the saturated vapor pressure pipe 84, and thus the gas pressures P1, P2, PR, and P0 increase to reach an atmospheric pressure at a time $t_{531}$. In this state, the on-off valve 40 is set to be in the closed state and then on-off valves 50, 52, and 54 are set to be in the closed state.

At the time $t_{531}$, the nitrogen gas of approximately atmospheric pressure is filled in the sample tubes 80 and 82 and the saturated vapor pressure pipe 84, all of the on-off valves are set to be in the closed state, and the adsorption characteristic measuring apparatus 10 is in a measurement completion state. Then, after completion processes of other portions are performed, at a time $t_{540}$, the rotary pump 68 is turned off and the power of the adsorption characteristic measuring apparatus 10 is turned off.

Returning again to FIG. 2, when the dead volume calculating process is completed, an adsorption amount calculating process is performed (S30). The adsorption amount is such that the amount of adsorption gas per 1 g of the sample 86 is represented by "ml" at a standard state (0° C. (=273.15 K), 1 atm) of a gas. In this way, the adsorption is represented by the volume. However, in order to distinguish from the volume of the dead volume $V_D$ or the reference volume $V_S$, the adsorption amount is represented by M2. Herein, it is assumed that "M" is derived from the number of moles.

In the measurement of the adsorption isotherm, a plurality of measured equilibrium pressure values from a measured equilibrium pressure value $P2_A(n=1)$ to a measured equilibrium pressure value $P2_A(n=n_{END})$ are acquired with respect to a plurality of measurement points from the measurement point "n=1" to the measurement point "n=$n_{END}$," respectively, and thus a plurality of true equilibrium pressure values from a true equilibrium pressure value $P2_C(n=1)$ to a true equilibrium pressure value $P2_C(n=n_{END})$ are calculated. In the very low pressure measurement mode, an adsorption amount M2 is calculated based on each of the plurality of measured equilibrium pressure values. In the very low pressure and high accuracy measurement mode or the very low pressure and high speed measurement mode, an adsorption amount M2 is calculated based on each of the plurality of true equilibrium pressure values.

In the following description, a measured equilibrium pressure value or a true equilibrium pressure value at a measurement point "n=n" is generally defined as an equilibrium pressure value P2(n), and pressure values of the reference volume portion 30 before and after the adsorption gas is introduced into the reference volume portion 30 are defined as $P1_F(n)$ and $P1_B(n)$, respectively. Subscript "F" of $P1_F$ indicates "former," and subscript "B" of $P1_B$ indicates "behind." In addition, the adsorption amount is referred to as M2 (n).

A single adsorption amount ΔM2 (n) at the measurement point (n) is calculated based on three components.

A first component is the amount of adsorption gas ΔM21 (n) introduced into the reference volume portion 30 at the measurement point (n) and is expressed by the following Equation (8).

$$\Delta M21(n) = \{P1_F(n) - P1_E(n)\} * V_S/T_R \quad (8)$$

A second component is the amount of adsorption, gas ΔM22 (n) which remains without being adsorbed onto the sample 86 in the dead volume portion including the sample tube 80 at a time of (end time of measurement point (n−1)=start time of measurement point (n)) and is expressed by the following Equation (9).

$$\Delta M22(n) = P2(n-1) * V_D/T_R \quad (9)$$

A third component is the amount of adsorption gas ΔM23 (n) which remains without being adsorbed onto the sample 86 in the dead volume portion including the sample tube 80 at an end time of the measurement point (n) and is expressed by the following Equation (10).

$$\Delta M23(n) = P2(n) * V_D/T_R \quad (10)$$

The single adsorption amount M2(n) at the measurement point (n) is expressed by the following Equation (11) using Equations (8) to (10). Here, "w" is a mass of the sample 86.

$$\Delta M2(n) = \{\Delta M21(n) + \Delta M22(n) - \Delta M23(n)\}/w \quad (11)$$

When ΔM2 (n) is obtained with respect to the plurality of measurement point from the measurement point (n=1) to the measurement point (n), the entire adsorption amount M2 (n) adsorbed onto the sample 86 at the measurement point (n) is expressed by the following Equation (12).

$$M2(n) = \Delta M2(n=1) + \Delta M2(n=2) + \ldots + \Delta M2(n=n-1) + \Delta M2(n=n) \quad (12)$$

In this way, the calculation of the adsorption amount M2 (n) for each measurement point (n) is performed. The adsorption amount calculating process is executed by a function of the measurement controller 70, but particularly, the calculation of the true adsorption amount based on the true equilibrium pressure value is executed by a function of the true adsorption amount calculating portion 77 in the measurement controller 70.

A value obtained by conversion of this M2 (n) into a standard state (0° C. (=273.15 K), 1 atm) of a gas can be used as a value of a vertical axis at the measurement point (n) of the adsorption isotherm. A horizontal axis at the measurement point (n) of the adsorption isotherm is a relative pressure value at the measurement point (n) obtained by normalization of the pressure value P2 of the dead volume portion including the sample tube 80 with the saturated vapor pressure P0 of the adsorption gas, and the relative pressure value is calculated by {P2(n)/P0}. In this way, sets of measurement values (adsorption amount, relative pressure value) at the plurality of measurement points are plotted by plotting the relative pressure value on the horizontal axis and the adsorption amount on the vertical axis, and thus the adsorption isotherm is calculated with respect to the sample 86. The adsorption isotherm calculating process is executed by a function of the adsorption isotherm calculating portion 79 in the measurement controller 70.

In the above, an ideal case where a measurement environment is not changed during the measurement period is described. It sometimes takes time more than a few tens of hours to measure the adsorption characteristics in total under the very low pressure value; for example, a temperature change during the measurement period or a change in the liquid level due to evaporation of the refrigerant occurs. By performing correction with respect to the adsorption characteristic measurement, it is possible to obtain the adsorption isotherm with higher accuracy. Several contents of the correction with respect to the adsorption characteristic measurement under the very low pressure value will be described below. Such correction is commonly applied to all of the measurement modes to be set by the measurement mode setting portion 90.

(1. Correction of Dead Volume Calculation with Respect to the Change in the Liquid Level 13 Due to Evaporation of the Refrigerant 12)

The change in the dead volume $V_D$ of the dead volume portion including the sample tube 80 due to the change in the liquid level 13 of the refrigerant 12 can be corrected by calculation of the change in the dead volume of the sample tube 82 which is a reference tube. When the level of the liquid level 13 of the refrigerant 12 is changed from level 1 to level 2, the pressure value of the sample tube 82, which is detected by the pressure gauge 62 when the liquid level 13 is level 1, is set to PR(1) and the dead volume of the sample tube 82 at that time is set to $V_D$PR(1). Similarly, when the liquid level 13 is level 2, the pressure value of the sample tube 82 is set to PR(2) and the dead volume of the sample tube 82 at that time is set to $V_D$PR(2). $V_D$PR(2) is expressed by the following Equation (13):

$$V_DPR(2) = V_DPR(1) * \{PR(1)/PR(2)\} \quad (13)$$

The change amount $\Delta V_D$PR of the dead volume in the sample tube 82 when the liquid level 13 is changed from level 1 to level 2 is calculated by the following Equation (14) based on Equation (13):

$$\Delta V_DPR = V_DPR(2) - V_DPR(1) = V_DPR(1) * [\{PR(1)/PR(2)\} - 1] \quad (14)$$

When the change amount of the dead volume $V_D$ of the dead volume portion including the sample tube 80 due to the change in the liquid level 13 is equal to the change amount of the dead volume of the sample tube 82 which is the reference tube, the correction of the change amount of the dead volume $V_D$ with respect to the change in the liquid level 13 can be performed in such a manner that the amount expressed by Equation (14) is added to the dead volume $V_D(1)$ when the liquid level 13 is level 1. Accordingly, the dead volume $V_D(2)$ after the correction when the liquid level 13 is level 2 is expressed by the following Equation (15).

$$V_D(2) = V_D(1) + \Delta V_DPR = V_D(1) + V_DPR(1) * [\{PR(1)/PR(2)\} - 1] \quad (15)$$

(2. Correction of $V_S$ and $V_D$ with Respect to a Gas Which is not an Ideal Gas)

The correction of the gas not being the ideal gas can be performed using a kind of gas, a temperature of the gas, and a compression factor "Z" depending on a pressure value of the gas. In the case of the ideal gas, the compression factor "Z" is 1.

Since the temperature of the reference volume portion 30 is the reference temperature $T_R$, when a compression factor at the reference temperature $T_R$ is set to $Z_R$, the correction with respect to the reference volume $V_S$ is expressed by tine following Equation (16).

$$(V_S \text{ after correction}) = V_S/Z_R \quad (16)$$

The volume of the dead volume portion is separated into a part $V_L$ in which the temperature is the constant temperature $T_L$ of the refrigerant 12 and a part $V_R$ in which the temperature is the reference temperature $T_R$. When a compression factor at the constant temperature $T_L$ is set to $Z_L$, the correction with respect to the dead volume $V_D$ is expressed by the following Equation (17):

$$(V_D \text{ after correction})=(V_L/Z_L)+(V_R/Z_R) \quad (17)$$

When the reference temperature $T_R$ and the temperature RT are approximately equal to each other from the viewpoint of the temperature $T_L$, the volumes $V_L$ and $V_R$ are obtained by solving simultaneous equations of Equation (18) by which a dead volume $V_D(T_L)$ at the constant temperature $T_L$ of the refrigerant 12 is expressed and Equation (19) by which a dead volume $V_D(RT)$ at the temperature RT.

$$V_D(T_L)=V_R+V_L*(T_R/T_L) \quad (18)$$

$$V_D(RT)=V_R+V_L \quad (19)$$

That is, Equation (20) is obtained with respect to the volume $V_R$ by modification of Equation (17).

$$V_R=V_D(T_L)-V_L*(T_R/T_L) \quad (20)$$

When arranging by substituting Equation (20) into Equation (19), the following Equation (21) is obtained with respect to the volume $V_L$:

$$V_L=\{V_D(T_L)-V_D(RT)\}*\{T_1/(T_R-T_L)\} \quad (21)$$

(3. Correction of the Pressure Value P1 with Respect to a Thermal Transpiration Effect)

The thermal transpiration effect is an effect that the pressure value P2 detected by the pressure gauge 60 and the internal pressure value $P_L$ of the sample tube 80 are different from each other from the fact that the temperature $T_R$ of the pressure gauge 60 in FIG. 1 and the temperature $T_L$ of the sample tube 80 immersed in the refrigerant 12 are different from each other and the diameter of a pipe for connecting the pressure gauge 60 and the sample tube 80 is fine to the extent of several mm. The pressure value P2 and the pressure value $P_L$ are expressed by the following Equation (22):

$$P_L/P2=[(P_{TTC}+1)/\{P_{TTC}+(T_R/T_L)^{1/2}\}] \quad (22)$$

Herein, "$P_{TTC}$" is indicated by "$\{AX^2+BX+C(X)^{1/2}\}$", "X, A, B, and C" are indicated by the following Equations (23), (24), (25), and (26), respectively, "d" is an inner diameter of the sample tube 80, and "D" is a diameter of a gas molecule.

$$X=(P2*760*d)/101.325 \quad (23)$$

$$A=1.4*10^{4}*\exp(11.7*D)*\{(T_R+T_L)/2\}^{-2} \quad (24)$$

$$B=5.6*\exp(14.0*D)*\{(T_R+T_L)/2\}^{-1} \quad (25)$$

$$C=\{(11.0/D)-14\}*\{(T_R+T_L)/2\}^{-1/2} \quad (26)$$

(4. Correction of Equations (8) to (10) with Respect to Temperature and Pressure Not Being in a Standard State)

Equations (8) to (10) are based on the assumption that the state of adsorption amount calculation is constant at 0° C. and 1 atm. In Equation (8), when temperatures of the reference volume portion 30 before and after the adsorption gas is introduced into the reference volume portion 30 are measured by an absolute temperature (K) and are defined as $T1_F(n)$ and $T1_E(n)$, respectively, Equation (8) is corrected to the following Equation (27):

$$\Delta M21(n) \text{ after correction}=[\{P1_F(n)/T1_F(n)\}-\{P1_B(n)/T1_E(n)\}]*V_S \quad (27)$$

Equation (9) is corrected to the following Equation (28):

$$\Delta M22(n) \text{ after correction}=\{P2(n-1)*V_D\}/T1_B(n-1) \quad (28)$$

Equation (10) is corrected to the following Equation (29):

$$\Delta M23(n) \text{ after correction}=\{P2(n)*V_D\}/T1_B(n) \quad (29)$$

Equation (10) is corrected to the following Equation (30):

$$\Delta M2(n) \text{ after correction}=\{\Delta M21(n)+\Delta M22(n)-\Delta M23(n)\}*(273.15/101325)/w \quad (30)$$

In these equations, the P2 is corrected to the $P_L$ in the case of incorporating the thermal transpiration effect. In the case of correcting the $V_S$ and $V_D$ with respect to the gas not being the ideal gas, the $V_S$ is corrected according to Equation (16), and the $V_D$ is corrected according to Equation (17).

In the above, the description of the correction for improving the accuracy of the measurement under the very low pressure is finished.

Figure 9:
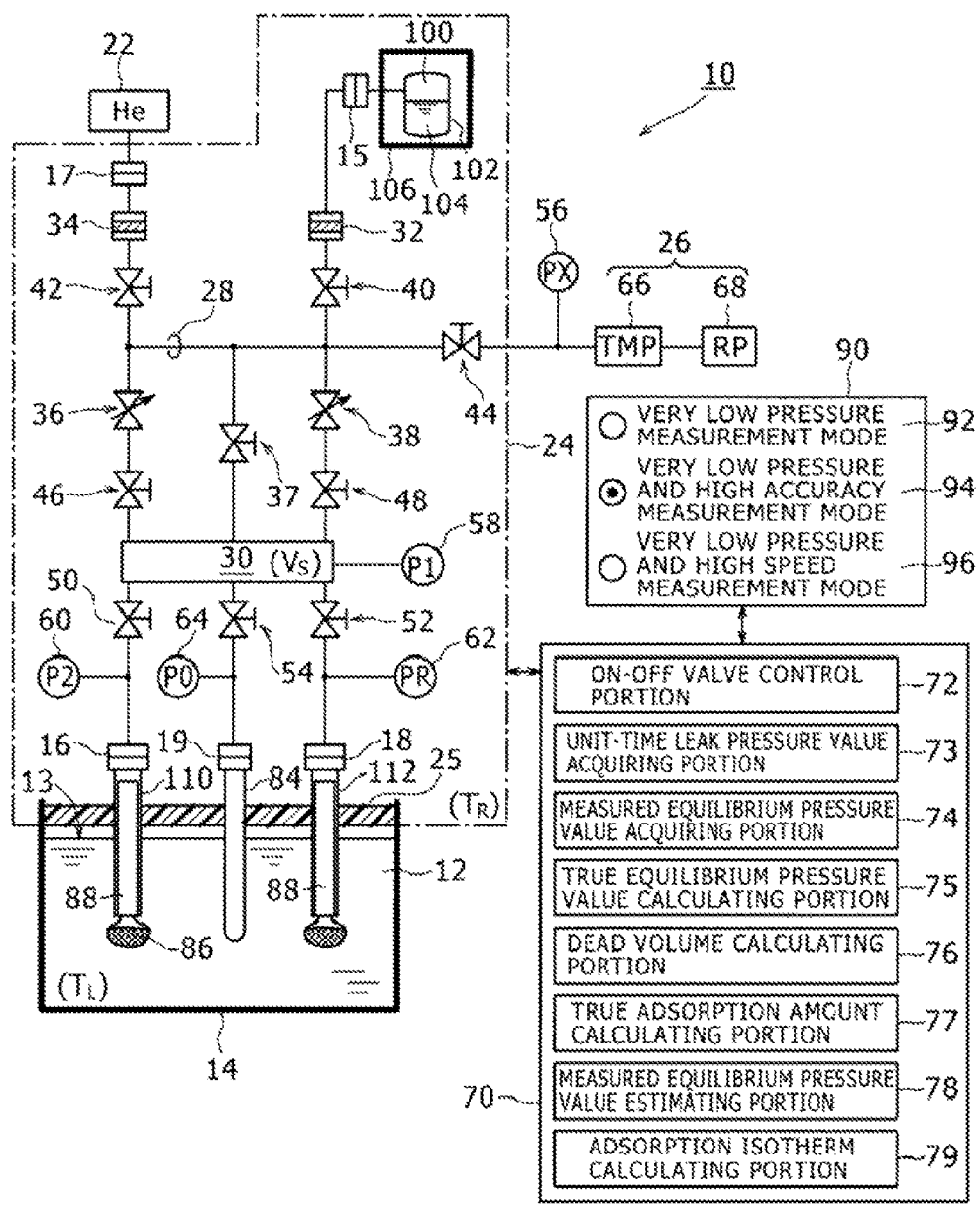
FIG. 9 is a configuration diagram of the adsorption characteristic measuring apparatus according to the embodiment of the invention when an adsorption gas is a steam gas.

In the above configuration, when the adsorption gas is the steam gas, the measurement under the very low pressure is difficult with respect to the case where the sample 86 is a powder having micropores, mesopores, and micropores such as zeolite. The adsorption characteristic measuring apparatus 10 illustrated in FIG. 9 is applicable to such a case. This apparatus is substantially the same as that in FIG. 1 except for the following configurations.

The adsorption gas is a steam gas 100, an adsorption gas supply source 102 has a liquid vessel 104 containing water therein, and the water is maintained at a predetermined constant temperature by a constant-temperature tank 106. The predetermined constant temperature is 40° C., for example. The fitting portion 15 is attached to the supply port of the liquid vessel 104.

The refrigerant 12 filled in the refrigerant container 14 is not liquid nitrogen and is maintained at a temperature lower than the temperature of the water inside the liquid vessel 104 maintained by the constant-temperature tank 106 by a given temperature difference. The given temperature difference is around about 10° C., for example. Water can be used as the refrigerant 12, and the temperature of the refrigerant 12 may be set to be 25° C. when the temperature of the constant-temperature tank 106 is 40° C.

In this way, the reason why an appropriate temperature difference is provided between the temperature of the refrigerant 12 and the temperature of the constant-temperature tank 106 is that the boiling point of water is 100° C. and thus the internal pressure of the liquid vessel 104 may become negative with respect to an external pressure when the temperature of the liquid vessel 104 is lower than 100° C. By the above configuration, it is possible to obtain the adsorption isotherm with high accuracy under the very low relative pressure value without fear of the negative pressure of the internal pressure of the liquid vessel 104 with respect to the external pressure.

With respect to the pipe portion 24 maintained at the reference temperature $T_R$ in FIG. 1, the range thereof is enlarged in FIG. 9, and the pipe portion 24 in FIG. 9 includes the constant-temperature tank 106 and a heat insulating material 108 which covers the liquid level 13 of the refrigerant 12 in the refrigerant container 14.

A sample 86 is a β-type zeolite powder where the ratio of Si and Al (Si/Al) is 6.6.

Figure 10:
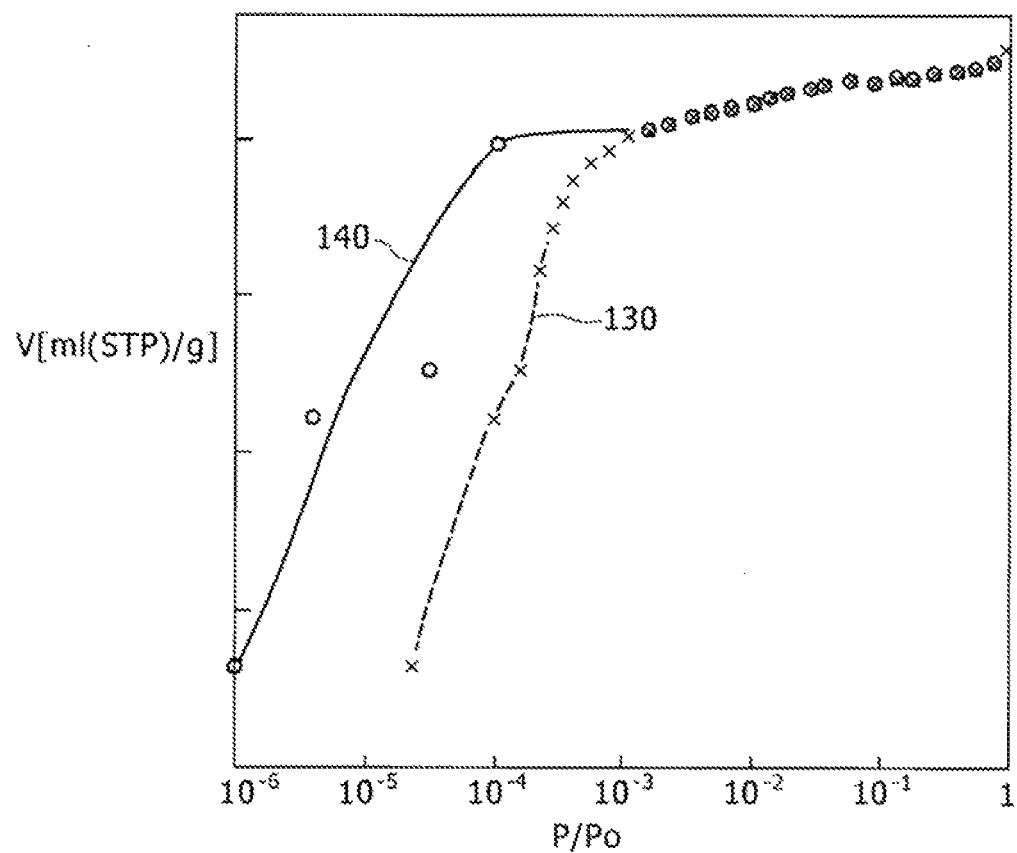
FIG. 10 is a diagram illustrating an example of an adsorption isotherm obtained using the adsorption characteristic measuring apparatus illustrated in FIG. 9.

FIG. 10 is a diagram illustrating an example where the adsorption isotherm is obtained at the very low pressure measurement mode and the very low pressure and high accuracy measurement mode using the adsorption characteristic measuring apparatus 10 illustrated in FIG. 9. A horizontal axis represents a relative pressure value $P/P_0$ obtained by normalization of a pressure value P with a saturated vapor pressure and a vertical axis represents an adsorption amount per sample 1 g obtained by conversion into the standard state of 0° C. and 1 atm. A broken line represents an adsorption isotherm 130 calculated at the very low pressure measurement mode, and a solid line represents an adsorption isotherm 140 calculated at the very low pressure and high accuracy measurement mode.

In the adsorption isotherm 130 calculated using the very low pressure measurement mode at which the real leak pressure value is not corrected, the relative pressure value is not measured up to $1\times10^{-5}$. In the adsorption isotherm 140 calculated using the very low pressure high accuracy measurement mode at which the real leak pressure value is corrected, the relative pressure value can be measured up to $1\times10^{-6}$. In this way, by the very low pressure and high accuracy measurement mode, even in an example where the β-zeolite powder is used as a sample, the steam gas is used in the adsorption gas, water of 25° C. is used as the refrigerant 12, it is possible to perform the measurement at the very low pressure side with good reproducibility for one or more digits compared to the case of using the very low pressure measurement mode corresponding to the related art.

What is claimed is:

1. An adsorption characteristic measuring apparatus that supplies a predetermined adsorption gas to a sample accommodated in a sample tube to measure an adsorption isotherm, the apparatus comprising:
a refrigerant container that is filled with a constant-temperature refrigerant in which the sample tube is immersed;
a sample tube fitting that is provided at an opening of the sample tube;
an adsorption gas supply configured to supply the adsorption gas;
a gas-supply fitting that is provided at a supply port of the adsorption gas supply;
a pipe that is provided between the gas-supply fitting and the sample tube fitting and includes a reference volume having an inner space of a predetermined reference volume, a plurality of pipes, and a plurality of on-off valves;
an exhaust pump that is connected to the pipe through the on-off valves;
a reference-volume pressure gauge configured to detect a pressure value of the reference volume,
a sample tube pressure gauge configured to detect an internal pressure of the sample tube; and
a measurement controller configured to perform opening/closing control of the plurality of on-off valves according to predetermined steps and measures an adsorption isotherm based on the internal pressure value of the sample tube and the pressure value of the reference volume,
wherein the measurement controller is configured to obtain a plurality of sets of measurement values including a true equilibrium pressure value and a true adsorption amount, and further configured to calculate the adsorption isotherm based on the plurality sets of measurement values,
wherein the measurement controller includes:
a unit-time leak pressure value receiver configured to receive a unit-time leak pressure value, wherein the unit-time leak pressure value is a pressure increase value per a unit time of the internal pressure value of the sample tube caused by a non-adsorption gas leaking from the outside of the sample tube fitting into an inner space of the sample tube in a state where the sample tube is sealed after the inside of the sample tube is exhausted;
a measured equilibrium pressure value receiver configured to determine a measured equilibrium pressure value at which a temporal change of the internal pressure value of the sample tube becomes an equilibrium state when the sample tube is in a closed state after supplying an adsorption gas present in the reference volume into the sample tube having the inside exhausted prior to the supplying;
a true equilibrium pressure value calculator configured to calculate a true equilibrium pressure value after correction of a real leak pressure value is performed on the measured equilibrium pressure value, the real leak pressure value being the unit-time leak pressure value multiplied by a leak time; and
a true adsorption amount calculator configured to calculate an adsorption amount of the adsorption gas on the sample under the true equilibrium pressure value based on the pressure value of the reference volume and the true equilibrium pressure value.

2. The adsorption characteristic measuring apparatus according to claim 1, wherein the measurement controller further includes a measured equilibrium pressure value estimator configured to estimate the measured equilibrium pressure value from the internal pressure values at a plurality of times to be acquired with respect to the temporal change of the internal pressure values of the sample tube, within a given time from when the adsorption gas present in the reference volume is supplied into the sample tube and the sample tube is in the closed state, and
wherein the true equilibrium pressure value calculator is configured to calculate a pressure value after the correction of the real leak pressure value is performed on the estimated measured equilibrium pressure value, as a true equilibrium pressure value.

3. The adsorption characteristic measuring apparatus according to claim 1, wherein the measurement controller is configured to execute:
a reference volume exhausting process, wherein the measurement controller is configured to close the on-off valve between the reference volume and the sample tube fitting and further configured to open the on-off valve between the reference volume and the exhaust pump to cause the exhaust pump to exhaust the inner space of the reference volume;
an adsorption gas introducing process, wherein the measurement controller is configured to close the on-off valve between the reference volume and the sample tube fitting and to open the on-off valve between the adsorption gas supply and the reference volume, and further configured to introduce the adsorption gas to the inner space of the reference volume, and to close the on-off valve between the adsorption gas supply and the reference volume; and
an adsorption gas supply process, wherein the measurement controller is configured to open the on-off valve between the reference volume and the sample tube fitting and to supply the adsorption gas of the reference volume to the sample tube to increase the internal pressure value of the sample tube and to decrease the pressure value of the reference volume until the internal pressure value of the sample tube and the pressure value of the reference volume match each other, and further configured to close the on-off valve between the reference volume and the sample tube fitting to set the sample tube to be in a sealed state at a time point when the internal pressure value of the sample tube decreases to a vicinity of a predetermined target equilibrium pressure value while the internal pressure value of the sample tube and the pressure value of the reference volume are decreasing at the same time after the matching, and wherein the measurement controller is configured to obtain a measured equilibrium pressure value, at which a temporal change of the internal pressure value of the sample tube is stable to be in an equilibrium state within a given temporal change variation range with the lapse of time under the sealed state of the sample tube.

4. The adsorption characteristic measuring apparatus according to claim 1, further comprising: a measurement mode setting interface configured to allow a user to set a measurement mode of:

a very low pressure and high accuracy measurement mode at which the adsorption isotherm is obtained based on the true equilibrium pressure value after the correction of the real leak pressure value is performed on the measured equilibrium pressure value;

a very low pressure measurement mode at which the adsorption isotherm is obtained using the measured equilibrium pressure value before the correction of the real leak pressure value is performed; and a very low pressure and high speed measurement mode at which the adsorption isotherm is obtained based on the pressure value after the correction of the real leak pressure value is performed on the estimated measured equilibrium pressure value.

5. The adsorption characteristic measuring apparatus according to claim 1, wherein the gas-supply fitting and the sample tube fitting are joints that are used such that metal surfaces are airtightly held by being butted on each other.

6. The adsorption characteristic measuring apparatus according to claim 1, wherein the adsorption gas supply is configured to supply a steam gas by water in the liquid vessel accommodated in a constant-temperature tank, wherein the gas-supply fitting is attached to the supply port of the liquid vessel, wherein the refrigerant filled in the refrigerant container is maintained at a constant temperature lower than a temperature of the constant-temperature tank by a predetermined temperature difference, and wherein a heat insulating material is disposed on the liquid level of the refrigerant in the refrigerant container.

* * * * *